(12) United States Patent
Jalbout et al.

(10) Patent No.: US 8,604,709 B2
(45) Date of Patent: *Dec. 10, 2013

(54) METHODS AND SYSTEMS FOR CONTROLLING ELECTRICAL POWER TO DC LOADS

(75) Inventors: Bassam D. Jalbout, Quebec (CA); Brian Wong, Kirkland (CA)

(73) Assignee: LSI Industries, Inc., Cincinnati, OH (US)

( * ) Notice: Subject to any disclaimer, the term of this patent is extended or adjusted under 35 U.S.C. 154(b) by 530 days.

This patent is subject to a terminal disclaimer.

(21) Appl. No.: 12/779,179

(22) Filed: May 13, 2010

(65) Prior Publication Data

US 2010/0244929 A1 Sep. 30, 2010

Related U.S. Application Data

(63) Continuation-in-part of application No. 12/466,688, filed on May 15, 2009, which is a continuation of application No. 11/882,323, filed on Jul. 31, 2007, now Pat. No. 7,598,683, application No. 12/779,179, which is a continuation-in-part of application No. 12/609,545, filed on Oct. 30, 2009.

(51) Int. Cl.
*H05B 37/02* (2006.01)

(52) U.S. Cl.
USPC ........... 315/291; 315/307; 315/312; 315/360; 315/362

(58) Field of Classification Search
USPC ............. 315/291, 307, 308, 209 R, 119, 121, 315/122, 123, 125–128, 185 R, 186, 192, 315/193, 185 S, 210, 224–226, 294, 297, 315/299–302, 310–311, 362
See application file for complete search history.

(56) References Cited

U.S. PATENT DOCUMENTS 4,090,189 A 5/1978 Fisler
4,163,969 A 8/1979 Enemark
(Continued)

FOREIGN PATENT DOCUMENTS

EP 1905637 4/2008
EP 1982886 10/2008
GB 2178568 2/1987
WO WO 02/29963 A2 4/2002

OTHER PUBLICATIONS

International Search Report and the Written Opinion from corresponding PCT/US2011/029170 dated Aug. 25, 2011.

(Continued)

*Primary Examiner* — Shawki Ismail
*Assistant Examiner* — Christopher Lo
(74) *Attorney, Agent, or Firm* — McDermott Will & Emery LLP

(57) ABSTRACT

Fixed Frequency, Fixed Duration power controls methods and systems are described for application of power to electrical loads. FFFD techniques according to the present disclosure utilize power train pulses with fixed-frequency fixed-duration pulses to control power applied to a load. The load can be any type of DC load. FFFD techniques allows for controlled variation of the fixed length of the ON pulse, the Fixed length of the OFF or recovery period, the total time period for one cycle, and/or the number of pulses in that time period. Applications to electric motors, electric lighting, and electric heating are described. Related circuits are also described.

25 Claims, 11 Drawing Sheets

(56) References Cited

U.S. PATENT DOCUMENTS

| | | |
|---|---|---|
| 4,284,884 A | 8/1981 | Dyment et al. |
| 4,388,558 A | 6/1983 | Mizuno et al. |
| 4,572,996 A | 2/1986 | Hanschke et al. |
| 4,574,225 A | 3/1986 | Pershall et al. |
| 4,574,686 A | 3/1986 | Budzich |
| 4,577,240 A | 3/1986 | Hedberg et al. |
| 4,583,027 A | 4/1986 | Parker et al. |
| 4,583,365 A | 4/1986 | John et al. |
| 4,584,511 A | 4/1986 | Rudich, Jr. et al. |
| 4,585,280 A | 4/1986 | Leiber |
| 4,589,520 A | 5/1986 | Tapfer |
| 4,590,563 A | 5/1986 | Matsumura et al. |
| 4,591,769 A | 5/1986 | Beckerman |
| 4,592,087 A | 5/1986 | Killion |
| 4,592,278 A | 6/1986 | Tokuno et al. |
| 4,594,978 A | 6/1986 | Kanno et al. |
| 4,595,433 A | 6/1986 | Ford et al. |
| 4,598,787 A | 7/1986 | Drutchas |
| 4,604,034 A | 8/1986 | Wheeldon et al. |
| 4,605,883 A | 8/1986 | Cockroft |
| 4,607,932 A | 8/1986 | Egawa et al. |
| 4,610,739 A | 9/1986 | Jensen |
| 4,611,154 A | 9/1986 | Lambropoulos |
| 4,614,901 A | 9/1986 | Kullman et al. |
| 4,617,637 A | 10/1986 | Chu et al. |
| 4,618,237 A | 10/1986 | Kitagawa |
| 4,618,761 A | 10/1986 | Inoue et al. |
| 4,622,499 A | 11/1986 | Squires et al. |
| 4,622,500 A | 11/1986 | Budelman |
| 4,623,974 A | 11/1986 | Denz et al. |
| 4,624,334 A | 11/1986 | Kelledes et al. |
| 4,626,763 A | 12/1986 | Edwards |
| 4,633,154 A | 12/1986 | Maeda |
| 4,633,156 A | 12/1986 | Besson et al. |
| 4,634,944 A | 1/1987 | Hastings et al. |
| 4,635,439 A | 1/1987 | Wible |
| 4,636,706 A | 1/1987 | Bowman et al. |
| 4,639,653 A | 1/1987 | Anderson et al. |
| 4,640,158 A | 2/1987 | Link et al. |
| 4,641,073 A | 2/1987 | Sawada |
| 4,642,441 A | 2/1987 | Kenyon |
| 4,642,537 A | 2/1987 | Young |
| 4,644,864 A | 2/1987 | Komorowski et al. |
| 4,649,287 A | 3/1987 | Nola |
| 4,651,068 A | 3/1987 | Meshkat-Razavi |
| 4,652,260 A | 3/1987 | Fenton et al. |
| 4,652,265 A | 3/1987 | McDougall |
| 4,654,566 A | 3/1987 | Erdman |
| 4,654,924 A | 4/1987 | Getz et al. |
| 4,658,742 A | 4/1987 | Tanasescu et al. |
| 4,659,974 A | 4/1987 | Bax et al. |
| 4,660,977 A | 4/1987 | Wittmer |
| 4,663,575 A | 5/1987 | Juzswik et al. |
| 4,666,020 A | 5/1987 | Watanabe |
| 4,667,137 A | 5/1987 | Macleod |
| 4,667,951 A | 5/1987 | Honjo et al. |
| 4,668,220 A | 5/1987 | Hawrylenko |
| 4,670,007 A | 6/1987 | Wheeldon et al. |
| 4,673,852 A | 6/1987 | Geiger |
| 4,675,575 A | 6/1987 | Smith et al. |
| 4,680,512 A | 7/1987 | Melocik |
| 4,684,855 A | 8/1987 | Kallos et al. |
| 4,686,436 A | 8/1987 | Archer |
| 4,686,437 A | 8/1987 | Langley et al. |
| 4,691,269 A | 9/1987 | Yamane et al. |
| 4,691,797 A | 9/1987 | Miller |
| 4,698,577 A | 10/1987 | Seymour et al. |
| 4,698,794 A | 10/1987 | Kruger et al. |
| 4,703,186 A | 10/1987 | Nakayama et al. |
| 4,705,500 A | 11/1987 | Reimels et al. |
| 4,705,997 A | 11/1987 | Juzswik |
| 4,716,409 A | 12/1987 | Hart et al. |
| 4,716,943 A | 1/1988 | Yoshida et al. |
| 4,719,361 A | 1/1988 | Brubaker |
| 4,722,021 A | 1/1988 | Hornung et al. |
| 4,724,495 A | 2/1988 | Hedberg et al. |
| 4,733,249 A | 3/1988 | Iwamoto et al. |
| 4,734,626 A | 3/1988 | Sutrina et al. |
| 4,734,861 A | 3/1988 | Bertolasi et al. |
| 4,745,900 A | 5/1988 | Thudt |
| 4,746,844 A | 5/1988 | MacKelvie et al. |
| 4,749,181 A | 6/1988 | Pittaway et al. |
| 4,749,193 A | 6/1988 | Hacker |
| 4,749,933 A | 6/1988 | Ben-Aaron |
| 4,750,837 A | 6/1988 | Gifford et al. |
| 4,751,978 A | 6/1988 | Drutchas et al. |
| 4,756,183 A | 7/1988 | Rajala et al. |
| 4,763,347 A | 8/1988 | Erdman |
| 4,770,065 A | 9/1988 | Woyton |
| 4,771,224 A | 9/1988 | Elms |
| 4,771,930 A | 9/1988 | Gillotti et al. |
| 4,774,448 A | 9/1988 | Yoshitomi |
| 4,774,914 A | 10/1988 | Ward |
| 4,774,916 A | 10/1988 | Smith |
| 4,777,382 A | 10/1988 | Reingold |
| 4,777,603 A | 10/1988 | Woodman et al. |
| 4,779,032 A | 10/1988 | Sakaegi et al. |
| 4,779,577 A | 10/1988 | Ritter et al. |
| 4,782,272 A | 11/1988 | Buckley et al. |
| 4,783,774 A | 11/1988 | Enomoto |
| 4,785,927 A | 11/1988 | Dobbins |
| 4,791,905 A | 12/1988 | Furuta et al. |
| 4,794,997 A | 1/1989 | North |
| 4,794,999 A | 1/1989 | Hester |
| 4,795,314 A | 1/1989 | Prybella et al. |
| 4,799,126 A | 1/1989 | Kruse et al. |
| 4,800,326 A | 1/1989 | Unsworth |
| 4,800,974 A | 1/1989 | Wand et al. |
| 4,802,768 A | 2/1989 | Gifford et al. |
| 4,802,777 A | 2/1989 | Yamada |
| 4,803,415 A | 2/1989 | Sepesy |
| 4,804,266 A | 2/1989 | Barshad |
| 4,805,750 A | 2/1989 | Nitz |
| 4,806,841 A | 2/1989 | Lee et al. |
| 4,807,420 A | 2/1989 | Barker |
| 4,808,895 A | 2/1989 | Fujita et al. |
| 4,808,994 A | 2/1989 | Riley |
| 4,811,901 A | 3/1989 | Stevens et al. |
| 4,812,724 A | 3/1989 | Langer et al. |
| 4,813,312 A | 3/1989 | Wilhelm |
| 4,814,674 A | 3/1989 | Hrassky |
| 4,815,278 A | 3/1989 | White |
| 4,818,920 A | 4/1989 | Jacob |
| 4,820,092 A | 4/1989 | Mueller et al. |
| 4,827,196 A | 5/1989 | Odell |
| 4,837,753 A | 6/1989 | Morris et al. |
| 4,839,754 A | 6/1989 | Gami et al. |
| 4,839,814 A | 6/1989 | Steidel |
| 4,843,297 A | 6/1989 | Landino et al. |
| 4,843,533 A | 6/1989 | Roof et al. |
| 4,854,902 A | 8/1989 | Havins |
| 4,856,286 A | 8/1989 | Sulfstede et al. |
| 4,859,921 A | 8/1989 | Archer |
| 4,870,556 A | 9/1989 | Inaba et al. |
| 4,873,463 A | 10/1989 | Jones |
| 4,874,997 A | 10/1989 | Daggett et al. |
| 4,876,491 A | 10/1989 | Squires et al. |
| 4,877,956 A | 10/1989 | Priest |
| 4,879,501 A | 11/1989 | Haner |
| 4,879,623 A | 11/1989 | Baumgartner et al. |
| 4,884,597 A | 12/1989 | Tamura et al. |
| 4,887,118 A | 12/1989 | Gaewsky |
| 4,888,531 A | 12/1989 | Hormann |
| 4,888,985 A | 12/1989 | Siemer |
| 4,889,097 A | 12/1989 | Bevill et al. |
| 4,890,047 A | 12/1989 | Maney |
| 4,891,764 A | 1/1990 | McIntosh |
| 4,897,882 A | 1/1990 | Pickering |
| 4,899,338 A | 2/1990 | Wroblewski |
| 4,901,142 A | 2/1990 | Ikuno et al. |
| 4,902,039 A | 2/1990 | Kawai et al. |
| 4,903,004 A | 2/1990 | Starke et al. |
| 4,904,919 A | 2/1990 | McNaughton |
| 4,906,906 A | 3/1990 | Lautzenhiser et al. |

(56) References Cited

U.S. PATENT DOCUMENTS

| | | |
|---|---|---|
| 4,907,223 A | 3/1990 | Wroblewski |
| 4,908,822 A | 3/1990 | Wroblewski |
| 4,914,592 A | 4/1990 | Callahan et al. |
| 4,916,367 A | 4/1990 | Yamaguchi et al. |
| 4,920,532 A | 4/1990 | Wroblewski |
| 4,922,572 A | 5/1990 | Kohl et al. |
| 4,925,443 A | 5/1990 | Heilman et al. |
| 4,926,037 A | 5/1990 | Martin-Lopez |
| 4,928,050 A | 5/1990 | Torisawa et al. |
| 4,931,715 A | 6/1990 | Lee et al. |
| 4,935,641 A | 6/1990 | Wilhelm |
| 4,938,474 A | 7/1990 | Sweeney et al. |
| 4,941,325 A | 7/1990 | Nuding |
| 4,942,529 A | 7/1990 | Avitan et al. |
| 4,947,015 A | 8/1990 | Lach |
| 4,952,196 A | 8/1990 | Chilcote et al. |
| 4,954,764 A | 9/1990 | Kim |
| 4,967,134 A | 10/1990 | Losic et al. |
| 4,967,869 A | 11/1990 | Nagaoka et al. |
| 4,969,128 A | 11/1990 | Dennis et al. |
| 4,969,739 A | 11/1990 | McGee |
| 4,970,958 A | 11/1990 | Lyon et al. |
| 4,973,174 A | 11/1990 | Losic et al. |
| 4,978,899 A | 12/1990 | Lautzenhiser et al. |
| 4,980,620 A | 12/1990 | Losic et al. |
| 4,981,091 A | 1/1991 | Taylor et al. |
| 4,982,384 A | 1/1991 | Pipkin et al. |
| 4,990,001 A | 2/1991 | Losic et al. |
| 4,998,294 A | 3/1991 | Banks et al. |
| 4,998,520 A | 3/1991 | Wright |
| 5,001,375 A | 3/1991 | Jones |
| 5,001,770 A | 3/1991 | Losic et al. |
| 5,005,088 A | 4/1991 | Fukushima et al. |
| 5,012,165 A | 4/1991 | Lautzenhiser et al. |
| 5,013,998 A | 5/1991 | Varga et al. |
| 5,015,937 A | 5/1991 | Wright et al. |
| 5,017,854 A | 5/1991 | Gully et al. |
| 5,020,125 A | 5/1991 | Losic et al. |
| 5,021,726 A | 6/1991 | Reinhardt et al. |
| 5,023,527 A | 6/1991 | Erdman et al. |
| 5,023,531 A | 6/1991 | Altemose et al. |
| 5,032,772 A | 7/1991 | Gully et al. |
| 5,034,622 A | 7/1991 | Kuzmik |
| 5,034,872 A | 7/1991 | Losic et al. |
| 5,036,307 A | 7/1991 | Reavell et al. |
| 5,041,070 A | 8/1991 | Blaser |
| 5,045,172 A | 9/1991 | Guzman |
| 5,049,046 A | 9/1991 | Escue et al. |
| 5,050,681 A | 9/1991 | Skinner |
| 5,059,876 A | 10/1991 | Shah et al. |
| 5,060,151 A | 10/1991 | Mikyska et al. |
| 5,060,454 A | 10/1991 | Benz |
| 5,068,582 A | 11/1991 | Scott |
| 5,070,292 A | 12/1991 | Goff |
| 5,072,399 A | 12/1991 | Laws et al. |
| 5,084,658 A | 1/1992 | Nielsen et al. |
| 5,087,356 A | 2/1992 | Webb |
| 5,089,759 A | 2/1992 | Miotke et al. |
| 5,095,222 A | 3/1992 | Pierret et al. |
| 5,097,494 A | 3/1992 | Pantelleria et al. |
| 5,099,186 A | 3/1992 | Rippel et al. |
| 5,099,368 A | 3/1992 | Okamura |
| 5,099,654 A | 3/1992 | Baruschke et al. |
| 5,108,322 A | 4/1992 | Henderson et al. |
| 5,117,165 A | 5/1992 | Cassat et al. |
| 5,119,136 A | 6/1992 | Morikawa |
| 5,122,719 A | 6/1992 | Bessenyei et al. |
| 5,126,647 A | 6/1992 | Blackburn et al. |
| 5,126,677 A | 6/1992 | Campbell et al. |
| 5,129,317 A | 7/1992 | Gloe et al. |
| 5,132,602 A | 7/1992 | Jorgensen et al. |
| 5,140,248 A | 8/1992 | Rowan et al. |
| 5,142,468 A | 8/1992 | Nerem |
| 5,142,861 A | 9/1992 | Schlicher et al. |
| 5,151,017 A | 9/1992 | Sears et al. |
| 5,151,641 A | 9/1992 | Shamoto |
| 5,155,419 A | 10/1992 | Naito |
| 5,156,005 A | 10/1992 | Redlich |
| 5,159,218 A | 10/1992 | Murry et al. |
| 5,159,370 A | 10/1992 | Takahashi |
| 5,160,925 A | 11/1992 | Dailey et al. |
| 5,161,073 A | 11/1992 | Gami et al. |
| 5,170,108 A | 12/1992 | Peterson et al. |
| 5,171,173 A | 12/1992 | Henderson et al. |
| 5,180,023 A | 1/1993 | Reimers |
| 5,181,616 A | 1/1993 | Gigan |
| 5,184,114 A | 2/1993 | Brown |
| 5,185,071 A | 2/1993 | Serwer et al. |
| 5,189,246 A | 2/1993 | Marsh et al. |
| 5,194,797 A | 3/1993 | Kahkipuro |
| 5,200,697 A | 4/1993 | Adler et al. |
| 5,200,944 A | 4/1993 | Souma |
| 5,202,951 A | 4/1993 | Doyle |
| 5,205,636 A | 4/1993 | Carpenter |
| 5,206,698 A | 4/1993 | Werner et al. |
| 5,231,747 A | 8/1993 | Clark et al. |
| 5,232,052 A | 8/1993 | Arvidson et al. |
| 5,234,050 A | 8/1993 | Weigert |
| 5,234,066 A | 8/1993 | Ahsing et al. |
| 5,241,257 A | 8/1993 | Nordby et al. |
| 5,246,479 A | 9/1993 | Gami et al. |
| 5,247,231 A | 9/1993 | Glucina |
| 5,249,046 A | 9/1993 | Ulich et al. |
| RE34,399 E | 10/1993 | Gami et al. |
| 5,252,905 A | 10/1993 | Wills et al. |
| 5,254,936 A | 10/1993 | Leaf et al. |
| 5,260,811 A | 11/1993 | Morikawa |
| 5,270,624 A | 12/1993 | Lautzenhiser |
| 5,270,631 A | 12/1993 | Takahashi et al. |
| 5,274,287 A | 12/1993 | Bahn |
| 5,278,481 A | 1/1994 | Danbury |
| 5,281,919 A | 1/1994 | Palanisamy |
| 5,281,956 A | 1/1994 | Bashark |
| 5,282,181 A | 1/1994 | Entner et al. |
| 5,282,641 A | 2/1994 | McLaughlin |
| 5,287,051 A | 2/1994 | Konrad et al. |
| 5,293,906 A | 3/1994 | Amin |
| 5,294,853 A | 3/1994 | Schluter et al. |
| 5,297,394 A | 3/1994 | Frohbieter et al. |
| 5,302,945 A | 4/1994 | Stoltenberg |
| 5,304,910 A | 4/1994 | Loncle et al. |
| 5,304,911 A | 4/1994 | Anderson |
| 5,306,990 A | 4/1994 | Hofsass et al. |
| 5,314,402 A | 5/1994 | Foote et al. |
| 5,315,218 A | 5/1994 | Fortune et al. |
| 5,315,442 A | 5/1994 | Sato et al. |
| 5,317,307 A | 5/1994 | Thomas, Jr. |
| 5,317,668 A | 5/1994 | Kobayashi |
| 5,319,352 A | 6/1994 | Robertson et al. |
| 5,321,231 A | 6/1994 | Schmalzriedt et al. |
| 5,323,483 A | 6/1994 | Baeg |
| 5,325,031 A | 6/1994 | Tilden |
| 5,330,342 A | 7/1994 | Linss et al. |
| 5,331,258 A | 7/1994 | Lankin et al. |
| 5,331,539 A | 7/1994 | Pfeifer et al. |
| 5,332,954 A | 7/1994 | Lankin |
| 5,333,655 A | 8/1994 | Bergamini et al. |
| 5,340,295 A | 8/1994 | Preiato et al. |
| 5,359,272 A | 10/1994 | Liao |
| 5,369,991 A | 12/1994 | Armstrong |
| 5,370,112 A | 12/1994 | Perkins |
| 5,373,436 A | 12/1994 | Yamaguchi et al. |
| 5,376,866 A | 12/1994 | Erdman |
| 5,389,864 A | 2/1995 | Tryan et al. |
| 5,396,306 A | 3/1995 | Kawasaki et al. |
| 5,396,443 A | 3/1995 | Mese et al. |
| 5,402,155 A | 3/1995 | Hatayama et al. |
| 5,404,085 A | 4/1995 | Resch et al. |
| 5,406,126 A | 4/1995 | Hadley et al. |
| 5,406,186 A | 4/1995 | Fair |
| 5,422,014 A | 6/1995 | Allen et al. |
| 5,425,005 A | 6/1995 | Urabe et al. |
| 5,430,362 A | 7/1995 | Carr et al. |
| 5,437,608 A | 8/1995 | Cutler |

(56) References Cited

U.S. PATENT DOCUMENTS

| | | |
|---|---|---|
| 5,437,634 A | 8/1995 | Amano |
| 5,442,276 A | 8/1995 | Schwartz et al. |
| 5,447,051 A | 9/1995 | Hanks et al. |
| 5,447,062 A | 9/1995 | Kopl et al. |
| 5,448,035 A | 9/1995 | Thutt et al. |
| 5,450,156 A | 9/1995 | Kawasaki et al. |
| 5,450,521 A | 9/1995 | Redlich et al. |
| 5,451,851 A | 9/1995 | Allen et al. |
| 5,459,379 A | 10/1995 | Takeda et al. |
| 5,461,881 A | 10/1995 | Handel et al. |
| 5,461,908 A | 10/1995 | Armstrong |
| 5,462,504 A | 10/1995 | Trulaske et al. |
| 5,466,209 A | 11/1995 | Takegawa et al. |
| 5,481,176 A | 1/1996 | DeBiasi et al. |
| 5,482,361 A | 1/1996 | Burckhardt et al. |
| 5,485,140 A | 1/1996 | Bussin |
| 5,486,748 A | 1/1996 | Konrad et al. |
| 5,487,290 A | 1/1996 | Miller et al. |
| 5,488,283 A | 1/1996 | Dougherty et al. |
| 5,489,771 A | 2/1996 | Beach et al. |
| 5,489,831 A | 2/1996 | Harris |
| 5,493,642 A | 2/1996 | Dunsmuir et al. |
| 5,494,112 A | 2/1996 | Arvidson et al. |
| 5,497,064 A | 3/1996 | Van Sistine |
| 5,500,578 A | 3/1996 | Kawamura et al. |
| 5,502,957 A | 4/1996 | Robertson |
| 5,503,059 A | 4/1996 | Pacholok |
| 5,506,487 A | 4/1996 | Young et al. |
| 5,506,775 A | 4/1996 | Tsurushima et al. |
| 5,512,811 A | 4/1996 | Latos et al. |
| 5,513,058 A | 4/1996 | Hollenbeck |
| 5,517,067 A | 5/1996 | Sata |
| 5,519,496 A | 5/1996 | Borgert et al. |
| 5,521,891 A | 5/1996 | Nakane |
| 5,524,461 A | 6/1996 | Nielsen et al. |
| 5,526,460 A | 6/1996 | DeFrancesco et al. |
| 5,530,326 A | 6/1996 | Galvin et al. |
| 5,542,921 A | 8/1996 | Meyers et al. |
| RE35,362 E | 10/1996 | Arvidson et al. |
| 5,563,481 A | 10/1996 | Krause |
| 5,563,486 A | 10/1996 | Yamamoto et al. |
| 5,563,790 A | 10/1996 | Wada et al. |
| 5,569,910 A | 10/1996 | Griesemer |
| 5,569,990 A | 10/1996 | Dunfield |
| 5,575,761 A | 11/1996 | Hajianpour |
| 5,581,254 A | 12/1996 | Rundel |
| 5,582,013 A | 12/1996 | Neufeld |
| 5,583,404 A | 12/1996 | Karwath et al. |
| 5,583,411 A | 12/1996 | Kusano et al. |
| 5,585,702 A | 12/1996 | Jackson et al. |
| 5,585,708 A | 12/1996 | Richardson et al. |
| 5,585,709 A | 12/1996 | Jansen et al. |
| RE35,428 E | 1/1997 | Wilhelm |
| RE35,469 E | 3/1997 | Ueki |
| 5,610,491 A | 3/1997 | Gotz et al. |
| 5,616,994 A | 4/1997 | Nagaoka et al. |
| 5,616,997 A | 4/1997 | Jackson et al. |
| 5,617,016 A | 4/1997 | Borghi et al. |
| 5,623,334 A | 4/1997 | Cho et al. |
| 5,630,398 A | 5/1997 | Gant et al. |
| 5,633,792 A | 5/1997 | Massey |
| 5,637,971 A | 6/1997 | Pratt |
| 5,637,975 A | 6/1997 | Pummer et al. |
| 5,642,270 A | 6/1997 | Green et al. |
| 5,644,302 A | 7/1997 | Hana et al. |
| 5,652,485 A | 7/1997 | Spiegel et al. |
| 5,652,928 A | 7/1997 | Baxter et al. |
| 5,653,135 A | 8/1997 | Miller et al. |
| 5,655,380 A | 8/1997 | Calton |
| 5,669,470 A | 9/1997 | Ross |
| 5,670,858 A | 9/1997 | Heath |
| 5,670,859 A | 9/1997 | North et al. |
| 5,673,028 A | 9/1997 | Levy |
| 5,674,019 A | 10/1997 | Munakata |
| 5,676,475 A | 10/1997 | Dull |
| 5,678,982 A | 10/1997 | Schwaiger |
| 5,682,144 A | 10/1997 | Mannik |
| 5,689,170 A | 11/1997 | Ishikawa |
| 5,691,898 A | 11/1997 | Rosenberg et al. |
| 5,694,020 A | 12/1997 | Lang et al. |
| 5,704,935 A | 1/1998 | Pahl et al. |
| 5,708,312 A | 1/1998 | Rosen et al. |
| 5,709,350 A | 1/1998 | Davis et al. |
| 5,714,855 A | 2/1998 | Domel et al. |
| 5,714,862 A | 2/1998 | Mikesell et al. |
| 5,720,194 A | 2/1998 | Miller et al. |
| 5,723,963 A | 3/1998 | Li et al. |
| 5,727,372 A | 3/1998 | Kanitz et al. |
| 5,729,103 A | 3/1998 | Domel et al. |
| 5,729,110 A | 3/1998 | Steeby et al. |
| 5,739,664 A | 4/1998 | Deng et al. |
| 5,740,783 A | 4/1998 | Learman et al. |
| 5,743,227 A | 4/1998 | Jacquet et al. |
| 5,747,971 A | 5/1998 | Rozman et al. |
| 5,752,385 A | 5/1998 | Nelson |
| 5,764,244 A | 6/1998 | Bruhn et al. |
| 5,774,626 A | 6/1998 | Shenk |
| 5,780,983 A | 7/1998 | Shinkawa et al. |
| 5,780,990 A | 7/1998 | Weber |
| 5,780,997 A | 7/1998 | Sutrina et al. |
| 5,784,541 A | 7/1998 | Ruff |
| 5,789,883 A | 8/1998 | Gilman |
| 5,798,623 A | 8/1998 | El-Sadi |
| 5,801,509 A | 9/1998 | Sawa et al. |
| 5,802,844 A | 9/1998 | Lee et al. |
| 5,804,133 A | 9/1998 | Denton |
| 5,804,948 A | 9/1998 | Foust |
| 5,804,999 A | 9/1998 | DeBoer et al. |
| 5,811,946 A | 9/1998 | Mullin et al. |
| 5,811,947 A | 9/1998 | Hurst et al. |
| 5,818,183 A | 10/1998 | Lambert et al. |
| 5,818,247 A | 10/1998 | Pyun |
| 5,821,635 A | 10/1998 | Kern |
| 5,821,658 A | 10/1998 | Boggs |
| 5,823,104 A | 10/1998 | Beisel et al. |
| 5,832,558 A | 11/1998 | Ehret et al. |
| 5,838,127 A | 11/1998 | Young et al. |
| 5,841,252 A | 11/1998 | Dunfield |
| 5,841,464 A | 11/1998 | Phillips |
| 5,845,991 A | 12/1998 | Sundquist |
| 5,847,526 A | 12/1998 | Lasko et al. |
| 5,848,634 A | 12/1998 | Will et al. |
| 5,852,355 A | 12/1998 | Turner |
| 5,856,731 A | 1/1999 | Rottmerhusen |
| 5,857,061 A | 1/1999 | Chang et al. |
| 5,867,393 A | 2/1999 | Richardson et al. |
| 5,868,175 A | 2/1999 | Duff et al. |
| 5,869,946 A | 2/1999 | Carobolante |
| 5,872,474 A | 2/1999 | Kagomiya et al. |
| 5,874,818 A | 2/1999 | Schuurman |
| 5,874,819 A | 2/1999 | Hormann |
| 5,877,798 A | 3/1999 | Clarke et al. |
| 5,883,516 A | 3/1999 | Van Steenwyk et al. |
| 5,883,987 A | 3/1999 | Ogoshi et al. |
| 5,886,504 A | 3/1999 | Scott et al. |
| 5,887,302 A | 3/1999 | DiMucci et al. |
| 5,892,672 A | 4/1999 | Preller |
| 5,893,425 A | 4/1999 | Finkle |
| 5,893,891 A | 4/1999 | Zahedi |
| 5,898,649 A | 4/1999 | Park |
| 5,905,347 A | 5/1999 | Kocis |
| 5,907,227 A | 5/1999 | Domel et al. |
| 5,908,286 A | 6/1999 | Clemmons |
| 5,914,578 A | 6/1999 | Rakov |
| 5,923,110 A | 7/1999 | Zhao et al. |
| 5,936,371 A | 8/1999 | Bolash et al. |
| 5,939,849 A | 8/1999 | Ushikoshi |
| 5,943,223 A | 8/1999 | Pond |
| 5,950,364 A | 9/1999 | Hormann |
| 5,953,681 A | 9/1999 | Cantatore et al. |
| 5,966,000 A | 10/1999 | Yang |
| 5,970,937 A | 10/1999 | Casellato et al. |
| 5,971,090 A | 10/1999 | Tanaka et al. |
| 5,971,713 A | 10/1999 | North |

(56) References Cited

U.S. PATENT DOCUMENTS

| | | |
|---|---|---|
| 5,982,118 A | 11/1999 | Gotou et al. |
| 5,986,539 A | 11/1999 | Johansson et al. |
| 5,990,646 A | 11/1999 | Kovach et al. |
| 5,993,354 A | 11/1999 | Winks |
| 5,998,946 A | 12/1999 | Kim |
| 6,002,226 A | 12/1999 | Collier-Hallman |
| 6,002,488 A | 12/1999 | Berg et al. |
| 6,005,366 A | 12/1999 | Majumdar et al. |
| 6,008,599 A | 12/1999 | Beck |
| 6,016,038 A | 1/2000 | Mueller et al. |
| 6,016,288 A | 1/2000 | Frith |
| 6,018,200 A | 1/2000 | Anderson et al. |
| 6,018,537 A | 1/2000 | Hofmann et al. |
| RE36,568 E | 2/2000 | Horst |
| 6,020,712 A | 2/2000 | Roesel et al. |
| 6,021,097 A | 2/2000 | Kanno et al. |
| 6,023,135 A | 2/2000 | Gilbreth et al. |
| 6,027,515 A | 2/2000 | Cimino |
| 6,028,406 A | 2/2000 | Birk |
| 6,032,415 A | 3/2000 | Tajima |
| 6,034,978 A | 3/2000 | Ujazdowski et al. |
| 6,038,918 A | 3/2000 | Newton |
| 6,039,137 A | 3/2000 | Schless |
| 6,049,197 A | 4/2000 | Caamano |
| 6,054,823 A | 4/2000 | Collings et al. |
| 6,057,658 A | 5/2000 | Kovach et al. |
| 6,058,032 A | 5/2000 | Yamanaka et al. |
| 6,060,852 A | 5/2000 | Domel et al. |
| 6,069,465 A | 5/2000 | Boois et al. |
| 6,072,752 A | 6/2000 | Igarashi et al. |
| 6,075,338 A | 6/2000 | Mazza et al. |
| 6,075,688 A | 6/2000 | Willard et al. |
| 6,078,156 A | 6/2000 | Spurr |
| 6,088,243 A | 7/2000 | Shin |
| 6,088,246 A | 7/2000 | Okuyama et al. |
| 6,091,887 A | 7/2000 | Dieterle et al. |
| 6,094,023 A | 7/2000 | Ericsson |
| 6,098,000 A | 8/2000 | Long et al. |
| 6,100,603 A | 8/2000 | Gold |
| 6,100,655 A | 8/2000 | McIntosh |
| 6,118,186 A | 9/2000 | Scott et al. |
| 6,118,238 A | 9/2000 | Munro et al. |
| 6,118,243 A | 9/2000 | Reed et al. |
| 6,121,744 A | 9/2000 | Hoda et al. |
| 6,123,312 A | 9/2000 | Dai |
| 6,128,323 A | 10/2000 | Myers et al. |
| 6,128,436 A | 10/2000 | Bos et al. |
| 6,148,784 A | 11/2000 | Masberg et al. |
| 6,150,771 A | 11/2000 | Perry |
| 6,150,774 A | 11/2000 | Mueller et al. |
| 6,150,789 A | 11/2000 | Pulford, Jr. |
| 6,157,661 A | 12/2000 | Walker et al. |
| 6,158,405 A | 12/2000 | Masberg et al. |
| 6,163,122 A | 12/2000 | Filippis |
| 6,163,275 A | 12/2000 | Hartzell |
| 6,164,258 A | 12/2000 | Petrovich et al. |
| 6,164,788 A | 12/2000 | Gemmell et al. |
| 6,175,204 B1 | 1/2001 | Calamatas |
| 6,178,992 B1 | 1/2001 | Van Der Paal |
| 6,179,105 B1 | 1/2001 | Haass |
| 6,181,089 B1 | 1/2001 | Kovach et al. |
| 6,188,187 B1 | 2/2001 | Harlan |
| 6,191,542 B1 | 2/2001 | Chliwnyj |
| 6,194,851 B1 | 2/2001 | Denault et al. |
| 6,194,862 B1 | 2/2001 | Hara |
| 6,194,877 B1 | 2/2001 | Judge et al. |
| 6,198,242 B1 | 3/2001 | Yokomori et al. |
| 6,198,970 B1 | 3/2001 | Freed et al. |
| 6,204,479 B1 | 3/2001 | Sickels |
| 6,204,621 B1 | 3/2001 | Gotou |
| 6,206,482 B1 | 3/2001 | Campau et al. |
| 6,208,931 B1 | 3/2001 | Schoettle et al. |
| 6,211,626 B1 | 4/2001 | Lys et al. |
| 6,222,172 B1 | 4/2001 | Fossum et al. |
| 6,222,332 B1 | 4/2001 | Fletcher et al. |
| 6,227,807 B1 | 5/2001 | Chase |
| 6,230,078 B1 | 5/2001 | Ruff |
| 6,237,461 B1 | 5/2001 | Poole |
| 6,242,889 B1 | 6/2001 | Belyo |
| 6,242,938 B1 | 6/2001 | Kessler |
| 6,243,635 B1 | 6/2001 | Swan et al. |
| 6,246,192 B1 | 6/2001 | Haass |
| 6,246,207 B1 | 6/2001 | VanSistine et al. |
| 6,259,225 B1 | 7/2001 | Matsumoto |
| 6,262,557 B1 | 7/2001 | Gotou et al. |
| 6,263,267 B1 | 7/2001 | Anthony et al. |
| 6,269,297 B1 | 7/2001 | Hosomi et al. |
| 6,269,844 B1 | 8/2001 | Zenoni et al. |
| 6,272,073 B1 | 8/2001 | Doucette et al. |
| 6,278,220 B1 | 8/2001 | Furukoshi et al. |
| 6,279,541 B1 | 8/2001 | Doane et al. |
| 6,286,609 B1 | 9/2001 | Carrier et al. |
| 6,291,911 B1 | 9/2001 | Dunk et al. |
| 6,295,487 B1 | 9/2001 | Ono et al. |
| 6,305,419 B1 | 10/2001 | Krieger et al. |
| 6,305,818 B1 | 10/2001 | Lebens et al. |
| 6,308,052 B1 | 10/2001 | Jamali et al. |
| 6,309,268 B1 | 10/2001 | Mabru |
| 6,314,003 B2 | 11/2001 | Preller |
| 6,323,625 B1 | 11/2001 | Bhargava |
| 6,325,142 B1 | 12/2001 | Bosley et al. |
| 6,326,713 B1 | 12/2001 | Judson |
| 6,328,245 B1 | 12/2001 | Kastfelt et al. |
| 6,330,260 B1 | 12/2001 | Onkels et al. |
| 6,330,261 B1 | 12/2001 | Ishihara et al. |
| 6,335,511 B1 | 1/2002 | Rothermel |
| 6,339,306 B1 | 1/2002 | Hara |
| 6,340,868 B1 | 1/2002 | Lys et al. |
| 6,348,775 B1 | 2/2002 | Edelson et al. |
| 6,353,299 B1 | 3/2002 | Ramachandran et al. |
| 6,355,987 B1 | 3/2002 | Bixel |
| 6,362,586 B1 | 3/2002 | Naidu |
| 6,364,726 B1 | 4/2002 | Motose et al. |
| 6,366,049 B1 | 4/2002 | Chen et al. |
| 6,367,180 B2 | 4/2002 | Weiss et al. |
| 6,370,174 B1 | 4/2002 | Onkels et al. |
| 6,375,630 B1 | 4/2002 | Cutler et al. |
| 6,379,025 B1 | 4/2002 | Mateescu et al. |
| 6,388,419 B1 | 5/2002 | Chen et al. |
| 6,393,212 B1 | 5/2002 | Hutchinson |
| 6,396,042 B1 | 5/2002 | Boardman et al. |
| 6,397,735 B1 | 6/2002 | Wong |
| 6,400,116 B1 | 6/2002 | Chen et al. |
| 6,402,042 B1 | 6/2002 | Stenzel et al. |
| 6,404,153 B2 | 6/2002 | Gotou |
| 6,409,672 B2 | 6/2002 | Webler et al. |
| 6,410,992 B1 | 6/2002 | Wall et al. |
| 6,411,040 B1 | 6/2002 | Ertl et al. |
| 6,412,293 B1 | 7/2002 | Pham et al. |
| 6,417,814 B1 | 7/2002 | Hupka et al. |
| 6,418,581 B1 | 7/2002 | Bruce et al. |
| 6,419,014 B1 | 7/2002 | Meek et al. |
| 6,424,106 B2 | 7/2002 | Gotou et al. |
| 6,426,601 B1 | 7/2002 | De Filippis et al. |
| 6,429,627 B1 | 8/2002 | Koss et al. |
| 6,429,936 B1 | 8/2002 | Scaduto |
| 6,435,925 B1 | 8/2002 | Mabru |
| 6,438,505 B1 | 8/2002 | Pouvreau |
| 6,442,181 B1 | 8/2002 | Oliver et al. |
| 6,448,676 B1 | 9/2002 | Kershaw et al. |
| 6,448,724 B1 | 9/2002 | Kleinau et al. |
| 6,449,870 B1 | 9/2002 | Perez et al. |
| 6,453,199 B1 | 9/2002 | Kobozev |
| 6,459,222 B1 | 10/2002 | Chen |
| 6,462,506 B2 | 10/2002 | Cochoy et al. |
| 6,467,557 B1 | 10/2002 | Krueger et al. |
| 6,477,193 B2 | 11/2002 | Oliver et al. |
| 6,479,957 B1 | 11/2002 | Erdman et al. |
| 6,482,064 B1 | 11/2002 | Lund |
| 6,486,639 B1 | 11/2002 | Montret et al. |
| 6,486,643 B2 | 11/2002 | Liu |
| 6,488,390 B1 | 12/2002 | Lebens et al. |
| 6,495,938 B2 | 12/2002 | Naito et al. |
| 6,495,986 B2 | 12/2002 | Schwesig |

(56) References Cited

U.S. PATENT DOCUMENTS

| | | |
|---|---|---|
| 6,495,996 B1 | 12/2002 | Redlich |
| 6,496,344 B1 | 12/2002 | Hog |
| 6,497,267 B1 | 12/2002 | Azar et al. |
| 6,504,330 B2 | 1/2003 | Fletcher |
| 6,504,334 B2 | 1/2003 | Sogawa |
| 6,510,995 B2 | 1/2003 | Muthu et al. |
| 6,512,199 B1 | 1/2003 | Blazina |
| 6,515,443 B2 | 2/2003 | Kelly et al. |
| 6,515,584 B2 | 2/2003 | DeYoung |
| 6,525,507 B2 | 2/2003 | Ganz |
| 6,531,839 B1 | 3/2003 | Shin et al. |
| 6,533,054 B1 | 3/2003 | Fey |
| 6,537,229 B1 | 3/2003 | Wang |
| 6,538,400 B2 | 3/2003 | Fowler et al. |
| 6,538,403 B2 | 3/2003 | Gorti et al. |
| 6,538,412 B1 | 3/2003 | Klose et al. |
| RE38,054 E | 4/2003 | Hofmann et al. |
| 6,540,533 B1 | 4/2003 | Schreiber |
| 6,545,438 B1 | 4/2003 | Mays |
| 6,548,967 B1 | 4/2003 | Dowling et al. |
| 6,553,049 B1 | 4/2003 | Besaucele et al. |
| 6,555,935 B1 | 4/2003 | Maskovyak et al. |
| 6,559,625 B2 | 5/2003 | Freund et al. |
| 6,561,962 B1 | 5/2003 | Engelhart |
| 6,566,827 B2 | 5/2003 | Gotou et al. |
| 6,567,450 B2 | 5/2003 | Myers et al. |
| 6,570,353 B2 | 5/2003 | Krotsch et al. |
| 6,577,080 B2 | 6/2003 | Lys et al. |
| 6,579,137 B2 | 6/2003 | Mabru |
| 6,580,309 B2 | 6/2003 | Jacobs et al. |
| 6,581,559 B1 | 6/2003 | Grob et al. |
| 6,586,902 B2 | 7/2003 | Gotou et al. |
| 6,591,201 B1 | 7/2003 | Hyde et al. |
| 6,591,593 B1 | 7/2003 | Brandon et al. |
| 6,592,449 B2 | 7/2003 | Cipolla et al. |
| 6,595,897 B1 | 7/2003 | Dykstra et al. |
| 6,600,287 B2 | 7/2003 | Gotou |
| 6,604,497 B2 | 8/2003 | Buehrle et al. |
| 6,605,928 B2 | 8/2003 | Gupta et al. |
| 6,608,453 B2 | 8/2003 | Morgan et al. |
| 6,617,817 B2 | 9/2003 | Hill |
| 6,618,133 B2 | 9/2003 | Hedges et al. |
| 6,624,597 B2 | 9/2003 | Dowling et al. |
| 6,625,191 B2 | 9/2003 | Knowles et al. |
| 6,630,764 B1 | 10/2003 | Dube et al. |
| 6,630,901 B1 | 10/2003 | Winter et al. |
| 6,635,972 B1 | 10/2003 | Barthel et al. |
| 6,639,372 B2 | 10/2003 | Gotou |
| 6,641,245 B1 | 11/2003 | Kelly et al. |
| 6,646,401 B2 | 11/2003 | Jaenicke |
| 6,650,072 B2 | 11/2003 | Harlan |
| 6,654,548 B2 | 11/2003 | Schmitz |
| 6,664,749 B2 | 12/2003 | Heydt et al. |
| 6,665,976 B2 | 12/2003 | West |
| 6,667,869 B2 | 12/2003 | Greenberg |
| RE38,400 E | 1/2004 | Kowall et al. |
| 6,675,590 B2 | 1/2004 | Aarestrup |
| 6,680,593 B2 | 1/2004 | Gotou |
| 6,686,719 B2 | 2/2004 | Cochov et al. |
| 6,690,704 B2 | 2/2004 | Fallon et al. |
| 6,693,395 B2 | 2/2004 | Wilhelm |
| 6,693,851 B1 | 2/2004 | Fujisawa et al. |
| 6,696,814 B2 | 2/2004 | Henderson et al. |
| 6,710,495 B2 | 3/2004 | Lipo et al. |
| 6,713,982 B2 | 3/2004 | Burse |
| 6,713,983 B2 | 3/2004 | Maruyama |
| 6,715,305 B2 | 4/2004 | Doi et al. |
| 6,717,376 B2 | 4/2004 | Lys et al. |
| 6,721,989 B1 | 4/2004 | Barlow |
| 6,724,122 B2 | 4/2004 | Frey et al. |
| 6,724,169 B2 | 4/2004 | Majumdar et al. |
| 6,724,376 B2 | 4/2004 | Sakura et al. |
| 6,724,692 B1 | 4/2004 | Akahane et al. |
| 6,726,698 B2 | 4/2004 | Cimino |
| 6,733,293 B2 | 5/2004 | Baker et al. |
| 6,734,639 B2 | 5/2004 | Chang et al. |
| 6,752,226 B2 | 6/2004 | Naito et al. |
| 6,757,316 B2 | 6/2004 | Newman et al. |
| 6,770,186 B2 | 8/2004 | Rosenfeld et al. |
| 6,779,758 B2 | 8/2004 | Vu et al. |
| 6,781,335 B2 | 8/2004 | Osinga et al. |
| 6,786,625 B2 | 9/2004 | Wesson |
| 6,788,011 B2 | 9/2004 | Mueller et al. |
| 6,798,812 B2 | 9/2004 | Rylov et al. |
| 6,799,877 B2 | 10/2004 | Watkins et al. |
| 6,801,560 B2 | 10/2004 | Knowles et al. |
| 6,808,287 B2 | 10/2004 | Lebens et al. |
| 6,808,508 B1 | 10/2004 | Zafirelis et al. |
| 6,812,667 B2 | 11/2004 | Yasohara et al. |
| 6,814,172 B1 | 11/2004 | Vu |
| 6,819,303 B1 | 11/2004 | Berger et al. |
| 6,825,624 B2 | 11/2004 | Anwar et al. |
| 6,837,099 B2 | 1/2005 | Kim et al. |
| 6,838,841 B2 | 1/2005 | Kessler |
| 6,841,947 B2 | 1/2005 | Berg-johansen |
| 6,844,714 B2 | 1/2005 | Balmain et al. |
| 6,850,020 B1 | 2/2005 | Midas et al. |
| 6,850,029 B1 | 2/2005 | Pollock et al. |
| 6,850,468 B2 | 2/2005 | Fujisawa et al. |
| 6,856,638 B2 | 2/2005 | Aab et al. |
| 6,864,662 B2 | 3/2005 | Recker |
| 6,864,688 B2 | 3/2005 | Beutelschiess et al. |
| 6,865,458 B1 | 3/2005 | Kim |
| 6,876,104 B1 | 4/2005 | Guo |
| 6,876,105 B1 | 4/2005 | Faizullabhoy et al. |
| 6,882,674 B2 | 4/2005 | Wittak et al. |
| 6,888,280 B2 | 5/2005 | Dube et al. |
| 6,891,294 B1 | 5/2005 | Deal |
| 6,895,175 B2 | 5/2005 | Fulton et al. |
| 6,897,416 B2 | 5/2005 | Bohlender et al. |
| 6,900,604 B2 | 5/2005 | Kokami et al. |
| 6,900,605 B2 | 5/2005 | Nakaho |
| 6,906,482 B2 | 6/2005 | Shimizu et al. |
| 6,911,796 B2 | 6/2005 | Castro |
| 6,914,919 B2 | 7/2005 | Watson et al. |
| 6,917,178 B2 | 7/2005 | Takeuchi et al. |
| 6,917,502 B2 | 7/2005 | Enzinna et al. |
| 6,927,524 B2 | 8/2005 | Pyntikov et al. |
| 6,933,822 B2 | 8/2005 | Haugs et al. |
| 6,935,595 B2 | 8/2005 | Butsch et al. |
| 6,940,239 B2 | 9/2005 | Iwanaga et al. |
| 6,940,685 B2 | 9/2005 | Chrappan Soldavini et al. |
| 6,941,793 B2 | 9/2005 | Rioux |
| 6,943,510 B2 | 9/2005 | Gorti |
| 6,950,272 B1 | 9/2005 | Rice et al. |
| 6,957,897 B1 | 10/2005 | Nelson et al. |
| 6,963,175 B2 | 11/2005 | Archenhold et al. |
| 6,965,205 B2 | 11/2005 | Piepgras et al. |
| 6,967,445 B1 | 11/2005 | Jewell et al. |
| 6,968,707 B2 | 11/2005 | Violand et al. |
| 6,975,079 B2 | 12/2005 | Lys et al. |
| 6,977,588 B2 | 12/2005 | Schotz et al. |
| 6,979,257 B2 | 12/2005 | Horner et al. |
| 6,979,967 B2 | 12/2005 | Ho |
| 6,987,787 B1 | 1/2006 | Mick |
| 6,988,820 B2 | 1/2006 | Drufva |
| 6,995,679 B2 | 2/2006 | Eskritt et al. |
| 7,005,646 B1 | 2/2006 | Jordanov et al. |
| 7,007,782 B2 | 3/2006 | Anwar et al. |
| 7,009,440 B2 | 3/2006 | Nogawa et al. |
| 7,009,653 B2 | 3/2006 | Yoo |
| 7,011,624 B2 | 3/2006 | Forsell |
| 7,012,396 B1 | 3/2006 | Brenden et al. |
| 7,014,336 B1 | 3/2006 | Ducharme et al. |
| 7,015,825 B2 | 3/2006 | Callahan |
| 7,034,899 B2 | 4/2006 | Symoen et al. |
| 7,038,399 B2 | 5/2006 | Lys et al. |
| 7,038,594 B2 | 5/2006 | Voreis et al. |
| 7,057,153 B2 | 6/2006 | Linge et al. |
| 7,058,107 B2 | 6/2006 | Knowles et al. |
| 7,064,503 B2 | 6/2006 | Marx et al. |
| 7,064,513 B2 | 6/2006 | Fenley |
| 7,065,435 B2 | 6/2006 | Gorman et al. |
| 7,071,894 B1 | 7/2006 | Thielemans et al. |

(56) References Cited

U.S. PATENT DOCUMENTS

| | | | |
|---|---|---|---|
| 7,074,182 B2 | 7/2006 | Rovegno |
| 7,077,345 B2 | 7/2006 | Byram et al. |
| 7,088,063 B2 | 8/2006 | Kurosawa et al. |
| 7,091,874 B2 | 8/2006 | Smithson |
| 7,095,002 B2 | 8/2006 | Kong et al. |
| 7,095,128 B2 | 8/2006 | Canini et al. |
| 7,095,197 B2 | 8/2006 | Benchaib et al. |
| 7,095,679 B2 | 8/2006 | Fujisawa et al. |
| 7,096,591 B2 | 8/2006 | Glantz et al. |
| 7,102,801 B2 | 9/2006 | Bliley et al. |
| 7,110,685 B2 | 9/2006 | Shin |
| 7,112,934 B2 | 9/2006 | Gilmore |
| 7,113,541 B1 | 9/2006 | Lys et al. |
| 7,116,075 B2 | 10/2006 | Gallagher et al. |
| 7,119,498 B2 | 10/2006 | Baldwin et al. |
| 7,123,211 B2 | 10/2006 | Nowatzyk |
| 7,123,458 B2 | 10/2006 | Mohr et al. |
| 7,124,691 B2 | 10/2006 | Donnelly et al. |
| 7,129,652 B2 | 10/2006 | Patel et al. |
| 7,129,668 B2 | 10/2006 | Kuribayashi et al. |
| 7,135,824 B2 | 11/2006 | Lys et al. |
| 7,144,383 B2 | 12/2006 | Arnett et al. |
| 7,145,298 B1 | 12/2006 | Garner |
| 7,145,302 B2 | 12/2006 | Sanglikar et al. |
| 7,145,834 B1 | 12/2006 | Jeter |
| 7,146,749 B2 | 12/2006 | Barron et al. |
| 7,154,239 B1 | 12/2006 | Chen et al. |
| 7,161,311 B2 | 1/2007 | Mueller et al. |
| 7,161,323 B2 | 1/2007 | Ajima et al. |
| 7,162,928 B2 | 1/2007 | Shank et al. |
| 7,164,364 B2 | 1/2007 | Ares Losada |
| 7,180,252 B2 | 2/2007 | Lys et al. |
| 7,183,723 B2 | 2/2007 | Yu et al. |
| 7,186,000 B2 | 3/2007 | Lebens et al. |
| 7,193,377 B2 | 3/2007 | Fung |
| 7,193,379 B2 | 3/2007 | Beaudion et al. |
| 7,199,883 B1 | 4/2007 | Schaad |
| 7,200,327 B2 | 4/2007 | Pierron et al. |
| 7,218,010 B2 | 5/2007 | Albertson et al. |
| 7,218,661 B2 | 5/2007 | Knowles et al. |
| 7,221,121 B2 | 5/2007 | Skaug et al. |
| 7,233,123 B2 | 6/2007 | Koczara et al. |
| 7,234,312 B2 | 6/2007 | Violand et al. |
| 7,235,044 B2 | 6/2007 | Forsell |
| 7,235,936 B2 | 6/2007 | Oba et al. |
| 7,239,097 B2 | 7/2007 | Hashimoto |
| 7,244,106 B2 | 7/2007 | Kallman et al. |
| 7,250,733 B2 | 7/2007 | Filippis et al. |
| 7,256,505 B2 | 8/2007 | Arms et al. |
| 7,256,727 B2 | 8/2007 | Fullerton et al. |
| 7,261,802 B2 | 8/2007 | Xu et al. |
| 7,262,574 B2 | 8/2007 | Koyanagi et al. |
| 7,263,953 B2 | 9/2007 | Sundararajan |
| 7,265,499 B2 | 9/2007 | Ball |
| 7,277,749 B2 | 10/2007 | Gordon et al. |
| 7,293,467 B2 | 11/2007 | Shank et al. |
| 7,294,982 B2 | 11/2007 | Kurosawa et al. |
| 7,296,913 B2 | 11/2007 | Catalano et al. |
| 7,298,101 B2 | 11/2007 | Watts et al. |
| 7,298,106 B2 | 11/2007 | Yamamoto et al. |
| 7,330,004 B2 | 2/2008 | DeJonge et al. |
| 7,332,881 B2 | 2/2008 | Clark et al. |
| 7,336,308 B2 | 2/2008 | Kubo |
| 7,339,344 B2 | 3/2008 | Borisavljevic |
| 7,351,954 B2 | 4/2008 | Zhang et al. |
| 7,352,339 B2 | 4/2008 | Morgan et al. |
| 7,373,529 B2 | 5/2008 | Nishida et al. |
| 7,391,180 B2 | 6/2008 | Armiroli et al. |
| 7,391,181 B2 | 6/2008 | Welchko et al. |
| 7,392,875 B2 | 7/2008 | Matsuzaki |
| 7,393,119 B2 | 7/2008 | Lebens et al. |
| 7,412,835 B2 | 8/2008 | Legall et al. |
| 7,414,374 B2 | 8/2008 | Watts et al. |
| 7,414,862 B2 | 8/2008 | Park |
| 7,415,781 B2 | 8/2008 | Barron et al. |
| 7,416,032 B2 | 8/2008 | Money et al. |
| 7,420,351 B2 | 9/2008 | Grbovic |
| 7,427,845 B2 | 9/2008 | Burse |
| 7,430,936 B2 | 10/2008 | Petzold et al. |
| 7,436,148 B2 | 10/2008 | Saeki et al. |
| 7,449,844 B2 | 11/2008 | Lev et al. |
| 7,449,860 B2 | 11/2008 | Sarlioglu et al. |
| 7,453,176 B2 | 11/2008 | Davison |
| 7,453,241 B2 | 11/2008 | Keiter et al. |
| 7,463,567 B2 | 12/2008 | Matsumoto |
| 7,467,830 B2 | 12/2008 | Donnelly |
| 7,471,055 B2 | 12/2008 | Atmur |
| 7,479,754 B2 | 1/2009 | Lucas et al. |
| 7,481,140 B2 | 1/2009 | Gass et al. |
| 7,482,767 B2 | 1/2009 | Tether |
| 7,482,768 B2 | 1/2009 | Lucas et al. |
| 7,485,979 B1 | 2/2009 | Staalesen |
| 7,486,488 B2 | 2/2009 | Wakatsuki et al. |
| 7,487,758 B1 | 2/2009 | Reid |
| 7,487,773 B2 | 2/2009 | Li |
| 7,488,079 B2 | 2/2009 | Hennes |
| 7,508,149 B2 | 3/2009 | Patel |
| 7,508,153 B2 | 3/2009 | Schanzenbach et al. |
| 7,509,945 B2 | 3/2009 | Teets et al. |
| 7,518,323 B2 | 4/2009 | Kuwada |
| 7,518,528 B2 | 4/2009 | Price et al. |
| 7,535,116 B2 | 5/2009 | Daigle et al. |
| 7,535,181 B2 | 5/2009 | Nicolai et al. |
| 7,535,187 B2 | 5/2009 | Carstensen |
| 7,598,683 B1 * | 10/2009 | Jalbout et al. ............... 315/291 |
| 7,638,950 B1 | 12/2009 | Jalbout et al. |
| 7,723,899 B2 | 5/2010 | Blandino et al. |
| 8,067,905 B2 | 11/2011 | Jalbout et al. |
| 8,421,368 B2 * | 4/2013 | Jalbout et al. ............... 315/291 |
| 2001/0010638 A1 | 8/2001 | Konno |
| 2001/0029422 A1 | 10/2001 | Schmitt |
| 2003/0016198 A1 | 1/2003 | Nagai et al. |
| 2005/0035729 A1 * | 2/2005 | Lev et al. .................... 315/291 |
| 2005/0040773 A1 * | 2/2005 | Lebens et al. ............... 315/291 |
| 2005/0052080 A1 | 3/2005 | Maslov et al. |
| 2005/0116698 A1 | 6/2005 | Prinz et al. |
| 2005/0225264 A1 * | 10/2005 | Kemp ......................... 315/291 |
| 2006/0192664 A1 * | 8/2006 | Kushida et al. ............. 340/463 |
| 2007/0038340 A1 | 2/2007 | Sekiguchi et al. |
| 2007/0187158 A1 | 8/2007 | Muta et al. |
| 2008/0310194 A1 | 12/2008 | Huang et al. |
| 2009/0139782 A1 | 6/2009 | Cull et al. |
| 2010/0244929 A1 | 9/2010 | Jalbout et al. |
| 2011/0017529 A1 | 1/2011 | Durney |
| 2011/0106350 A1 | 5/2011 | Jalbout et al. |

OTHER PUBLICATIONS

International Search Report and the Written Opinion from Corresponding PCT/US2010/053653 dated Nov. 7, 2012.
Fahimi et al., "A Switched Reluctance Machine-Base Starter/Alternator or More Electric Cars," IEEE Transactions on Energy Conversion, 19:116-124 (2004).
TMS320LF2407A Specifications (2000).

* cited by examiner

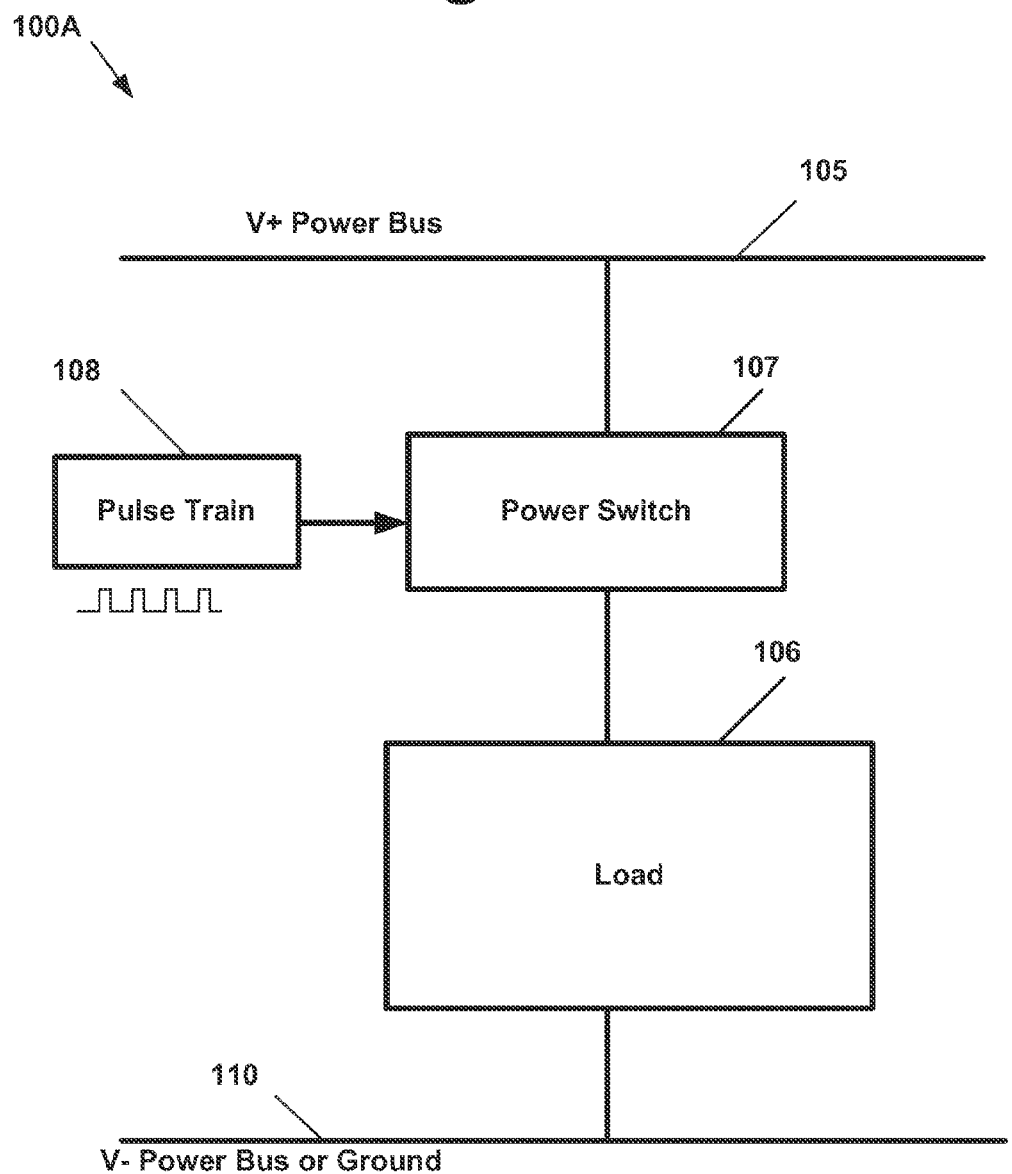

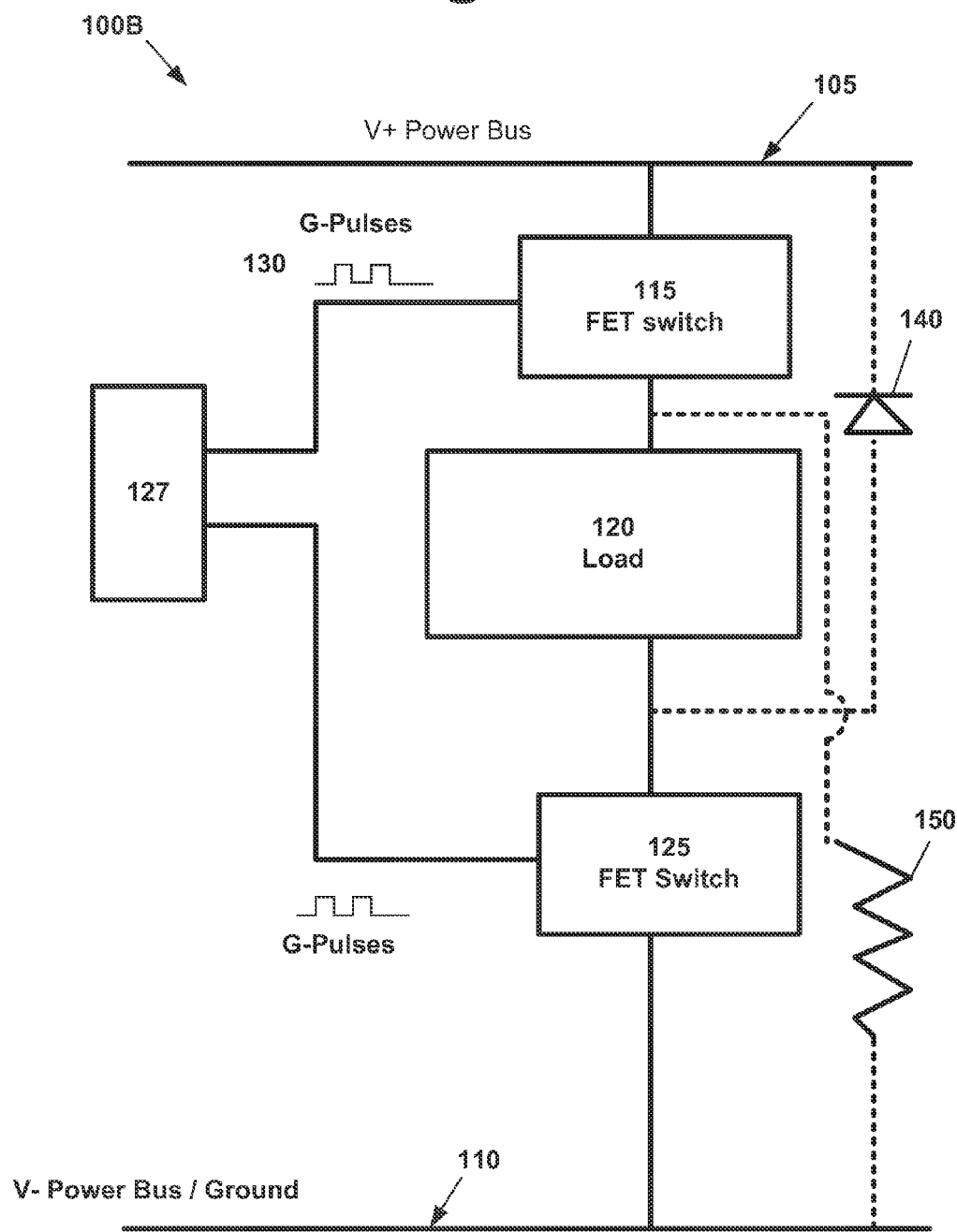

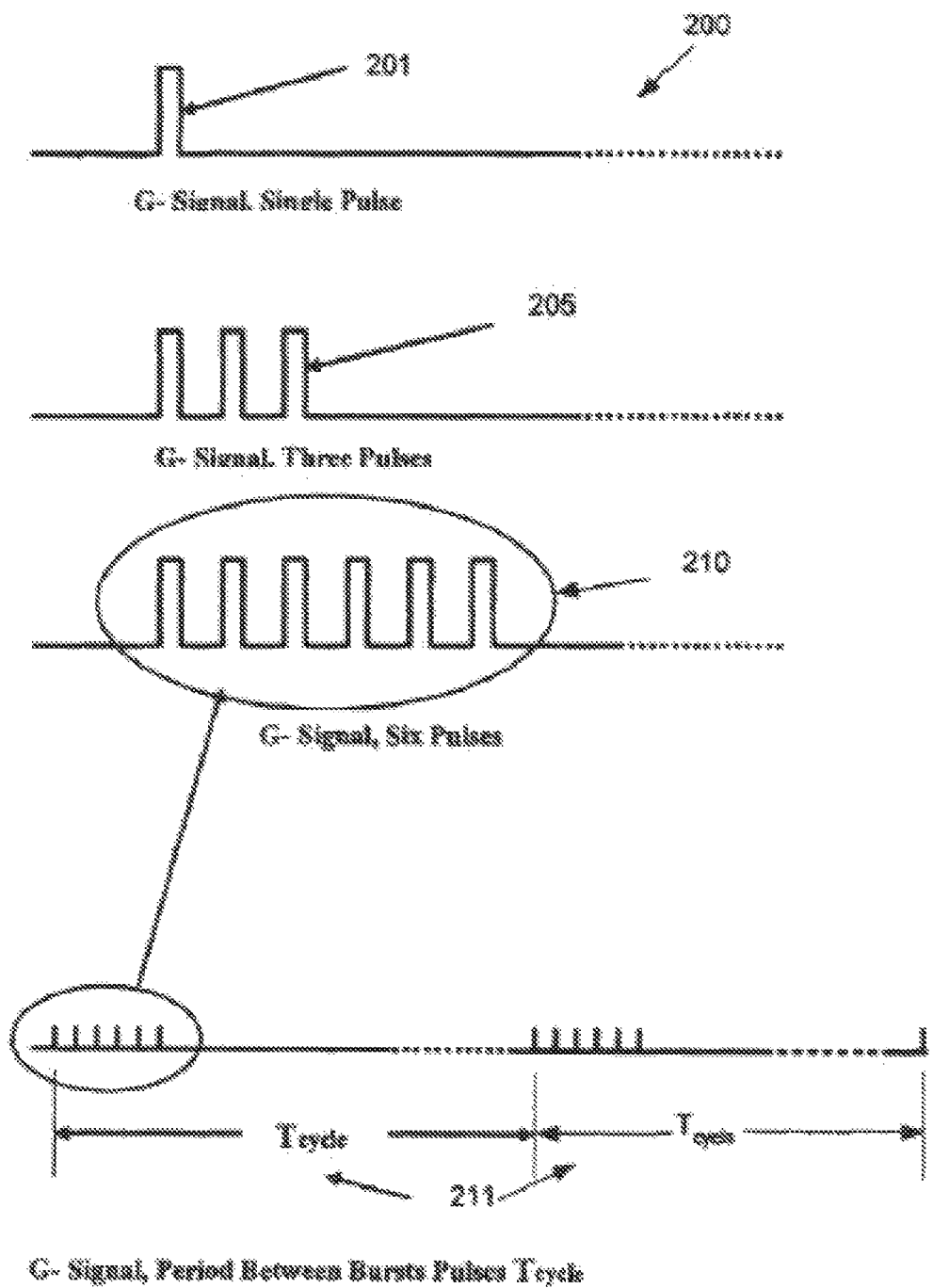

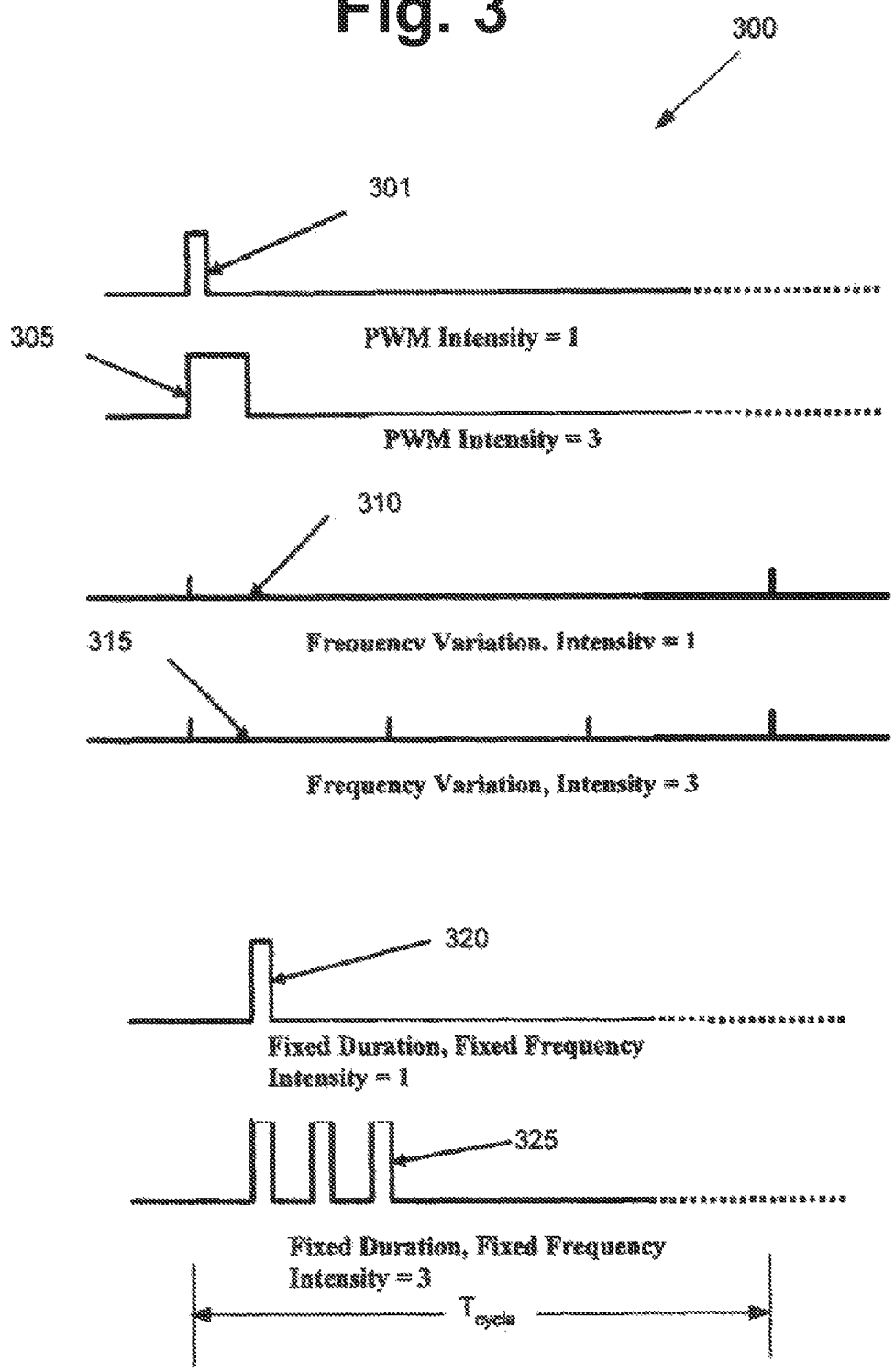

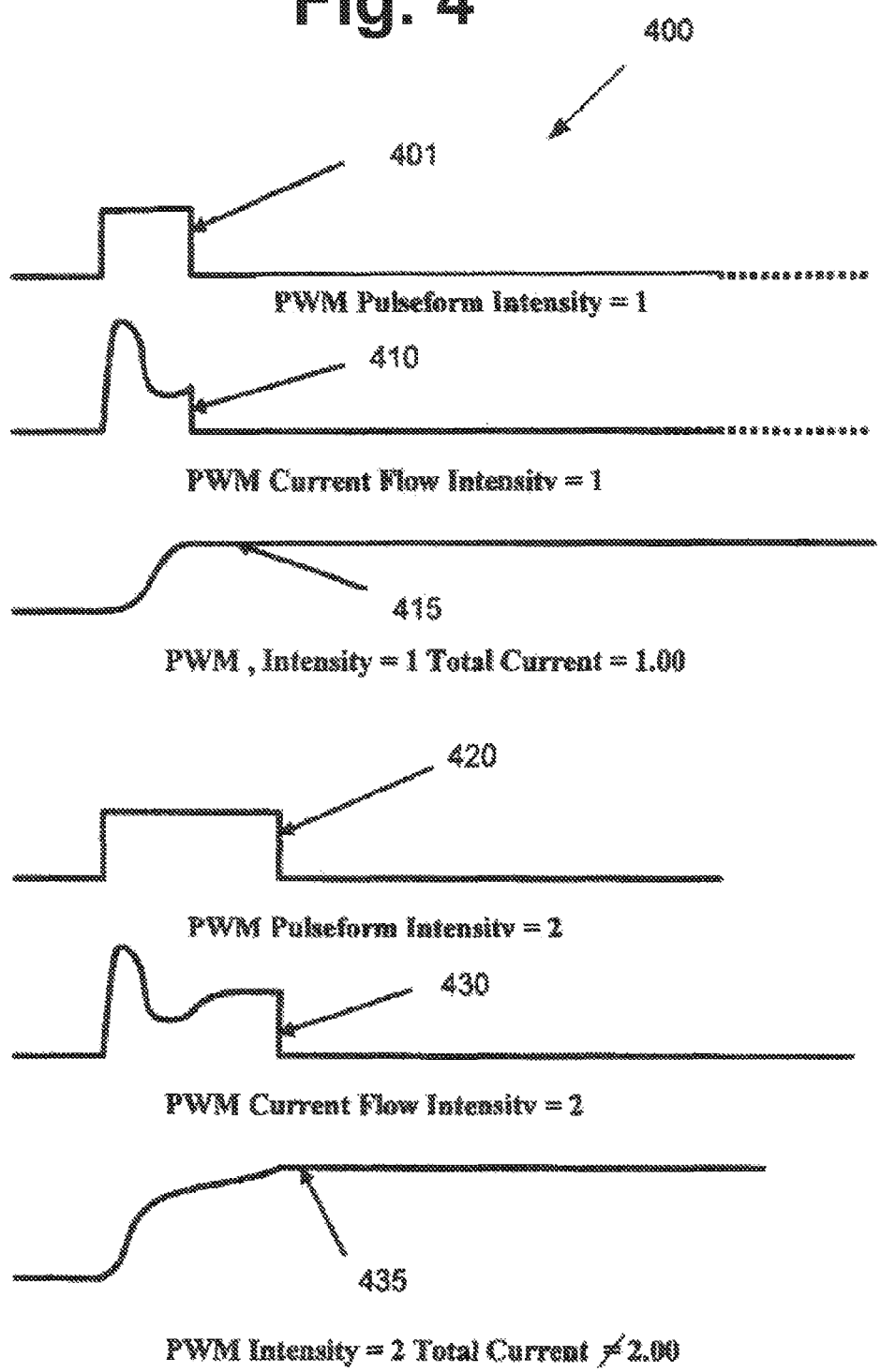

Fig. 7
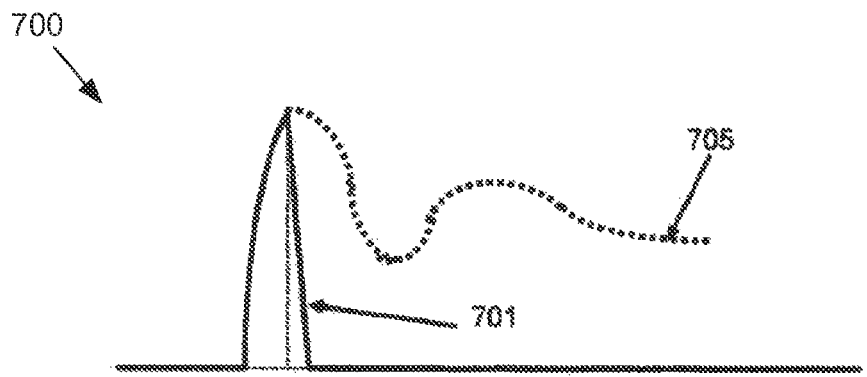
Actual Waveform of Fixed Duration / Fixed Frequency Pulse
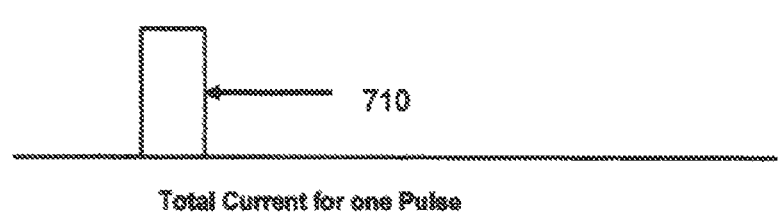
Total Current for one Pulse
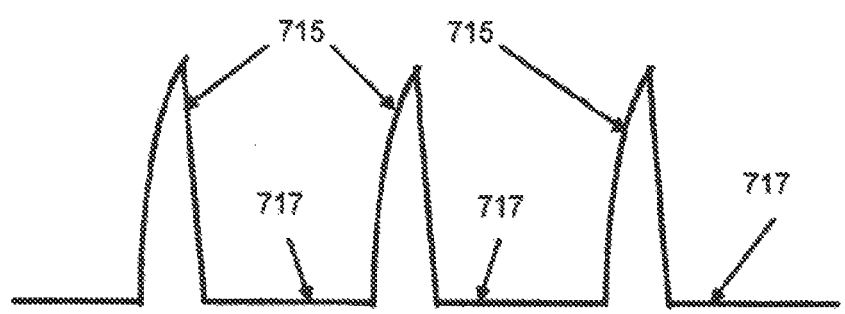
Actual Waveforms of Fixed Duration / Fixed Frequency Pulses
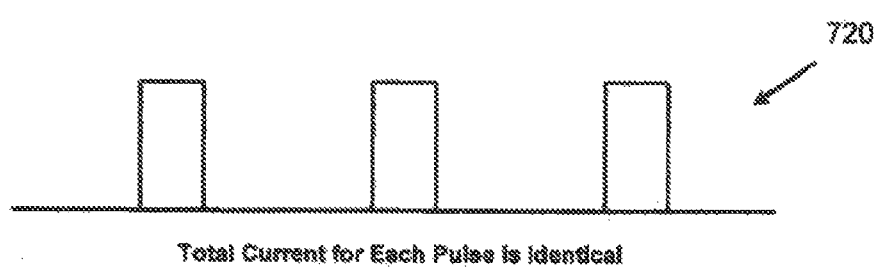
Total Current for Each Pulse is Identical

METHODS AND SYSTEMS FOR CONTROLLING ELECTRICAL POWER TO DC LOADS

RELATED APPLICATIONS

This application is a continuation-in-part of U.S. patent application Ser. No. 12/466,688, filed May 15, 2009 and entitled "Control of Lighting Intensity Using Pulses of a Fixed Duration and Frequency," which is a continuation of U.S. patent application Ser. No. 11/882,323, filed Jul. 31, 2007 and entitled "Control of Lighting Intensity Using Pulses of a Fixed Duration and Frequency," now issued as U.S. Pat. No. 7,598,683; this application is also a continuation-in-part of U.S. patent application Ser. No. 12/609,545, filed Oct. 30, 2009 and entitled "Traction System for Electrically Powered Vehicles"; the entire contents of all of which applications are incorporated herein by reference.

BACKGROUND

Conventional methods of incrementally controlling the power to a DC load by using a switching element to connect a DC power rail to the powered load include pulse trains of various types, such as Pulse Width Modulation (or "PWM"), and pulses of constant width with varying frequency (or "VF"). Both methods effectively change the duty cycles of the pulse trains but both have operational shortcomings.

SUMMARY

Aspects and embodiments of the of the present disclosure address problems previously described by providing control pulses with both fixed frequency, and fixed time period or duration. Such techniques may be referred to herein or in related applications as "FF/FD," "FFFD," "FD/FF," or "FDFF" techniques, in reference to the fixed-frequency fixed-duration nature of the pulses in a pulse train. The power provided to the electrical load(s) is varied by changing the number of times the pulses are fired within a set time period. FFFD techniques according to the present disclosure have distinct advantages over the conventional PWM and VF methods, as described in further detail herein.

An aspect of the present disclosure is directed to methods of using pulses of fixed duration and fixed frequency for power control of electrical loads.

In an exemplary embodiments, a method can include, with a processing system, providing a timing signal and determining a desired power level for an electrical load. The method can include generating a control signal including a sequence of control pulses of fixed duration and fixed frequency within the timing signal and corresponding to the desired power level. The control signal can be supplied to an input of a current switch connected to the electrical load to place the switch in one of an ON state during each pulse and an OFF state after each pulse to cause current to flow from a first potential to a second potential through the electrical load during the ON state.

The method can further include varying the number of pulses within a repeating time cycle.

The electrical load can include one or more DC electric motors.

Providing a timing signal can include using software using decrementing or incrementing counters to control the time periods of the control pulses.

The method can further include controlling the movement of one or more DC electrical motors.

The method can include generating a control signal comprises using analog pulse shaping circuits.

The method can include controlling power applied to one or more electric motors.

The method can include controlling power applied to one or more electric light sources.

The method can include controlling the intensity of the optical output of the one or more light sources by varying the number of pulses within a repeating time cycle.

The method can include controlling power applied to one or more heating devices.

The method can include controlling a heat output by varying the number of pulses within a repeating time cycle.

The method can include controlling power applied to one or more switching power supplies, by varying the number of pulses within a repeating time cycle.

A further aspect of the present disclosure is directed to controls circuits/devices that are functional to provide FFFD power trains for the control of power supplied to an electrical load.

An exemplary embodiment of a FFFD control circuit can include a first power potential and a second power potential, and an electrical load. The control circuit can also include a current switch connected to the electrical load and including an input to receive a current switch control signal to place the switch in one of an ON state and an OFF state including a timing cycle with a series of pulses of fixed duration and fixed frequency within the timing cycle to cause current to flow from the first potential to the second potential through the load during the ON state to cause the load to receive power over the timing cycle.

The load can include one or more light emitting diodes (LEDs).

The load can include an array of light emitting diodes (LEDs), e.g., parallel strings of LEDs in series.

The load can include an electric circuit of a DC motor.

The DC motor can be a brushless DC motor.

The load can include an electric circuit of an AC motor.

The FFFD circuit can have an initial condition before flow of current through the current switch and the period time between pulses of the timing cycle is longer than the period of time for the circuit to return to the initial condition after a pulse of the timing cycle.

The number of pulses in a timing cycle can vary from zero to a maximum number corresponding to an intensity level of the LED from zero to a maximum intensity.

The load can include a heating element.

The number of pulses in a timing cycle can vary from zero to a maximum number corresponding to a heat output level of the heating element from zero to a maximum heat output.

The circuit can also include a processing device to generate the current switch control signal supplied to the current switch and to time the start and end of each pulse within the timing cycle.

The circuit can also include a second current switch connected to the load.

The circuit can also include a shunt resistor connected to the first or second current switches and the first or second power potentials.

The circuit can also include a shunt diode connected to the first or second current switches and the first or second power potentials.

It will be appreciated that the foregoing embodiments and aspects can be combined or arranged in any practical combination.

Other features of embodiments of the present disclosure will be apparent from the description, the drawings, and the claims herein.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 1A depicts a simplified circuit schematic showing a method of using an electronic switch to control the current flow through a generic electrical load, in accordance with exemplary embodiments of the present disclosure;

FIG. 1B depicts a simplified circuit schematic showing a method of using an electronic switch to control the current flow through the load, in accordance with exemplary embodiments of the present disclosure.

FIG. 2 includes a collection of timing diagrams that show the basic timing scheme of pulses used in the FFFD control techniques, in accordance with exemplary embodiments of the present disclosure;

FIG. 3 includes a collection of timing diagrams that illustrate differences between embodiments of FFFD pulse train techniques in accordance with the present disclosure and the previous PWM pulse methods;

FIG. 4 includes a collection of waveforms that illustrate inaccuracies of previous PWM methods;

FIG. 7 includes a collection of waveforms illustrating why FFFD pulses give a consistent current flow for each pulse, in accordance with exemplary embodiments of the present disclosure;

Figure 5:
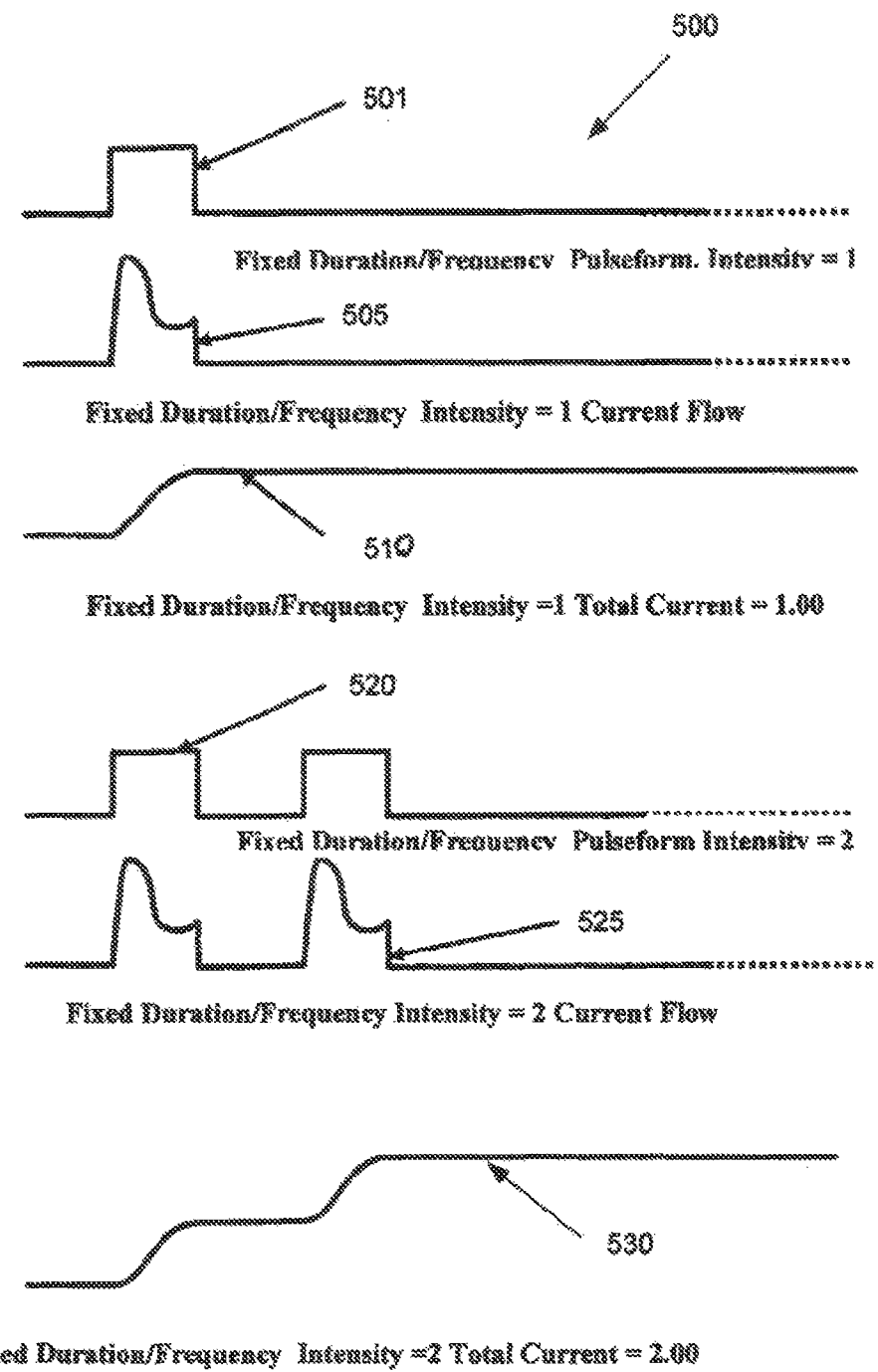
FIG. 5 includes a collections of waveforms that illustrate accuracies of embodiments of FFFD techniques, in accordance with exemplary embodiments of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure. Accordingly, the drawings and detailed description are to be regarded as illustrative in nature and not as restrictive.

DETAILED DESCRIPTION

In the following detailed description, numerous specific details are set forth to provide a full understanding of aspects and embodiments of the present disclosure. It will be apparent, however, to one ordinarily skilled in the art that aspects and embodiments of the present disclosure may be practiced without some of these specific details. In other instances, well-known structures and techniques have not been shown in detail to for ease in comprehension.

It is to be understood that both the foregoing summary of the present disclosure and the following detailed description are exemplary and explanatory and are not intended to limit the scope of the present disclosure. Moreover, with regard to terminology used herein, a reference to an element in the singular is not intended to mean "one and only one" unless specifically stated, but rather "one or more." The term "some" refers to one or more. Underlined and/or italicized headings and subheadings are used for convenience only, do not limit the present disclosure, and are not referred to in connection with the interpretation of the description of the present disclosure.

Embodiments of the present disclosure are directed to control techniques for the delivery or application of power to electrical (including electronic) loads by the application of control pulses having fixed frequency and fixed duration (FFFD). The load can be any type of DC load, though for different applications, some variations in the electrical circuitry may be required. Such FFFD techniques can provide a more precise delivery of power that previous techniques, notable PWM and VF techniques. Such precise power deliver is desirable in many uses, for power loads in general, and for electrical motors, electric lights, and electric heating elements, in particular. Such precision power delivery can be particularly well suited for fine-detail work such as in the controlled movement of artificial limbs, robots, remote robotic arms such as on the Space Shuttle, and motorized medical or surgical equipment, where a tine touch and precision are critical. Other applications requiring precise motor movements include control of aircraft such as pilotless drones, the movement of astronomical telescopes, and movement of long range weapons such as naval cannons.

FFFD techniques according to the present disclosure, include apparatus and/or methods, for driving an electrical load, e.g., an electric motor, can be more precise than either Pulse Width Modulation (PWM) or Variable Frequency (VF) techniques. For example, PWM changes (1) the width of the pulse, and (2) the total cycle length, for a total of 2 variable control parameters. VF changes (1) the pulse length, and (2) the frequency of these pulses, for a total of two variable control parameters. Use of FFFD techniques can allow a designer to change (1) the fixed length of the ON pulse, (2) the Fixed length of the OFF or recovery period, (3) the total time period for one cycle, and/or (4) the number of pulses in that time period. Especially relevant is the precise delivery of power for each of the FFFD ON pulses, thus allowing a precise motor movement, when an electrical motor is the electrical load. Accordingly, FFFD techniques in accordance with the present disclosure can be advantageously utilized in place of PWM and/or VF techniques.

FIG. 1A depicts a simplified circuit schematic illustrating a general technique (system and/or method) 100A of FFFD power control, in accordance with exemplary embodiments of the present disclosure. As shown, a DC load 106 can be connected to and powered by the current supplied from a positive-voltage rail 105 flowing to a negative-voltage rail 110. A power switch 107 can interrupt this current flow, or let it pass uninterrupted, as commanded by the control pulses 108. The pattern and effective duty cycle of the pulse train 108 ultimately determines the effective current flow through the load 106, but the accuracy, efficiency, and effectiveness of that current depends on the specific pattern of the pulse train, as described in the following description. If the power switch 107 is a power field effect transistor (FET) device, then the pulse train 108 (or G pulses) would be applied to the gate of the FET. In other configurations, any type of power switch device, such as transistors, could be used.

FIG. 1B depicts a simplified circuit schematic 100B depicting some of the different configurations that may be required for non resistive loads. In contrast to FIG. 1A, FIG. 1l3 shows two switching elements, 115 and 125. This double switching can completely isolate the load 120 from both the V plus and V negative lines simultaneously, using the G pulse trains 130 for both switches. This may be required, for example, when the load 120 is highly inductive in nature, such as with an electrical motor. When an inductive load is switched to the OFF condition, the induced current will cause a voltage spike to occur at the negative end of load 120, so in that case, a shunt diode 140 may be required to clamp this current to a reasonable voltage. Similarly, if load 120 was required to have a very precise amount of power, e.g., it was desired for the switching OFF condition to be as close to zero as possible, then shunt resistor 150 would effectively shunt away the leakage current which flows through switch device 115 in the OFF condition.

In the example shown in FIG. 1l3, it can be seen that the load 120 is truly in a zero current state when switched OFF, whereas in FIG. 1A, load 106 could continue to have the leakage current of switch 107 flowing through it during the OFF state. Obviously, other circuit designs using FFFD techniques may include only some of these additional components, or even more and different components, as may be required for the variations in specific loads of that particular circuit design and required performance.

It will be appreciated that FFFD techniques in accordance with the present disclosure can be used in place of PWM and/or VF techniques. The electric load, to which power is applied by a FFFD technique, can be virtually any type of element or component for which it is desired to control the power supplied. The power applied to a load can be controlled by varying the number of FFFD pulses within a repeating time cycle. For example, such loads can include, but are not limited to any the following: electric or electrically powered power tools, electric lighting of any kind, e.g., LED arrays, high-intensity discharge (HID) lighting, etc., electric heater and heating elements, fan motors and air cleaners, electrically powered bicycles, motorcycles, scooters, electric golf carts, electronic toys, electrical steering, electrically powered boats, electrically powered hydraulics, including their use in jacks, handcarts, hand pallet movers, electronic or electrically powered artificial limbs, electrically powered toothbrushes, electronic or electrically powered medical equipment, including adjustable beds, wheelchairs, suction equipment, artificial hearts, dental drills, electrically powered pumps, electronic and electrically powered pilotless aircraft, electrically powered exercise equipment, including treadmills, stair climbers, electrically powered vehicles, including buses, trains, streetcars, trolleys, subway cars, electric appliances, including refrigerators, electrically powered gardening tools, including clippers, weed cutters, hedge trimmers, lawn mowers. Exemplary embodiments can be utilized with brushless DC motors, including those used for linear and rotary actuators or servomotors.

FIG. 2 depicts a set of timing diagrams illustrating a basic concept of the FFFD method, in accordance with exemplary embodiments of the present disclosure. As shown, a single G pulse 201 can turn on a power switch, e.g., power switch 107 in FIG. 1A, for a short period of time equal to the base pulse length. This supplies a set amount of power to a load, e.g., load 106 of FIG. 1A. For example, if three times (3×) as much power is required to be delivered to the load, then three (3) pulses 205 are clocked by the pulse control train, e.g., pulse train 108 of FIG. 1A. These pulses, e.g., as shown for pulse train 108 of FIG. 1A, can be formed by the output of a microcomputer or other similar device (e.g., processor system such a CPU or the like) with a logic level output. Similarly, if, say, six times (6×) as much power is required, then six (6) pulses are sent to the power switch, e.g., power switch 107 of FIG. 1A. This pattern can be repeated in cycles (or period) of length Tcycle 211, which can be chosen to be short enough not to cause problems in the load, e.g., load 106 of FIG. 1A, but long enough to allow the maximum required pulses 108 needed for the load. If the Tcycle (timing cycle period) is too long, the power to the load may seem to be uneven, i.e., be sporadic.

With continued reference to FIG. 2, the Tcycle 211 is preferably long enough to have a sufficient number of pulses for fine control. For example, if is desired for the load to be controlled within 1 percent in power steps, then Tcycle 211 will preferably include at least a count of 100 pulses of cycle type 210 lengths long. The determination of Tcycle would then depend on the application, that is, the specific requirement of the particular load, e.g., load 106 of FIG. 1A. If the load is, for example, a LED light, then the pulses 210 might be a fraction of a microseconds each, and the Tcycle 211 a fraction of a millisecond. If the load, e.g., load 106, is an electric motor of an automobile, then the pulses 210 may be, e.g., 20 milliseconds, and Tcycle 211 may be, e.g., 250 milliseconds, depending on design specifics.

FIG. 3 depicts a collection 300 of timing diagrams illustrating differences between the FFFD embodiments of the present disclosure, and the conventional power control approaches of pulse width modulation (PWM) and variable frequency (VF). In PWM, pulse 301 shows a pulse for a minimum time period. As shown, when three times (3×) the amount of power is required, the pulse length 305 is made three times (3×) longer. Ideally, pulse 305 would give times (3×) as much power as pulse 301. As later shown, this is only the ideal case; this does not happen in a real circuit. Pulse stream 310 shows a specific pulse repetition frequency for supplying power of level 1 in a VF approach. To supply three times (3×) the power, a frequency of three times (3×) is required, resulting in pulse stream 315. Again, this should supply three times (3×) the power in an ideal world, however, as will be shown, such a VF approach/scheme can have discrepancies in a real circuit application. In contrast, the FFFD pulses are shown as 320 and 325. Pulse 320 represents a power level 1 pulse signal stream. Pulses 325 represent a power level 3 (3 times the power of level 1) pulse signal stream. Since pulse stream 325 is essentially the repetition of pulse 320 three times, the power resulting from 325 is essentially three times that of pulse stream 320.

FIG. 4 depicts a collection 400 of timing diagrams illustrating shortcomings of PWM techniques. FIG. 4 shows why the PWM method is not accurate in real circuits. Suppose pulse 401 is the pulse for the lowest power state of a PWM application. This results in a current flow typically shown as 410. Although ideally the current should be a square wave function, i.e. the same shape as the control pulse 401, the real situation has both capacitive and inductive effects. This is true even when the load is purely resistive, as the connecting circuits have a finite length of conductor, which in turn have appreciable stray capacitance and inductance. Thus the typical waveform of current flow 410 exhibits distortion due to these non zero capacitive and inductive values. This rise time and "ringing" waveform can be easily seen by connecting an oscilloscope probe to a typical circuit. This ringing has an effect on the PWM method. The total current flow resulting from pulse 401 is then represented by plot 415. Where pulse 420 represents the PWM pulse for level 2 of a PWM example, pulse 420 is as near as possible twice the length of pulse 401. The result is a current flow shown by plot 430. Again, in an ideal situation, the shape of 430 should be the same shape as control pulse 420, and ideally, the total current flow of 430 would be exactly double that of current flow 410. In a real life circuit, plot 430 is a typical representation of the actual current flow. Due to the ringing of 410 and 430, the total current flow 435 is not twice the total of 415 but rather is some other value (example of this are shown in FIG. 6).

FIG. 5 shows how the FFFD method is more precise at producing increments of power. In an FFFD pulse, 501, the resulting instantaneous current flow to the load is shown by a real life, typical waveform 505. This results in a total current flow shown by curve 510. When twice the amount of power is desired, the FFFD method uses two pulses, as represented by 520. Since both of these pulses are essentially identical, and each is the same shape and length as 501, the resulting instantaneous current flow 525 is just two essentially identical waveforms 525, each of which is essentially the same as 505. Thus the total current flow 530 resulting from two FFFD pulses 520, is essentially twice the current flow of 510, which is for the single pulse 501. Even with a real life circuit, with significant ringing, two pulses 520 provide essentially twice the power of one pulse, 501, as shown.

Figure 6:
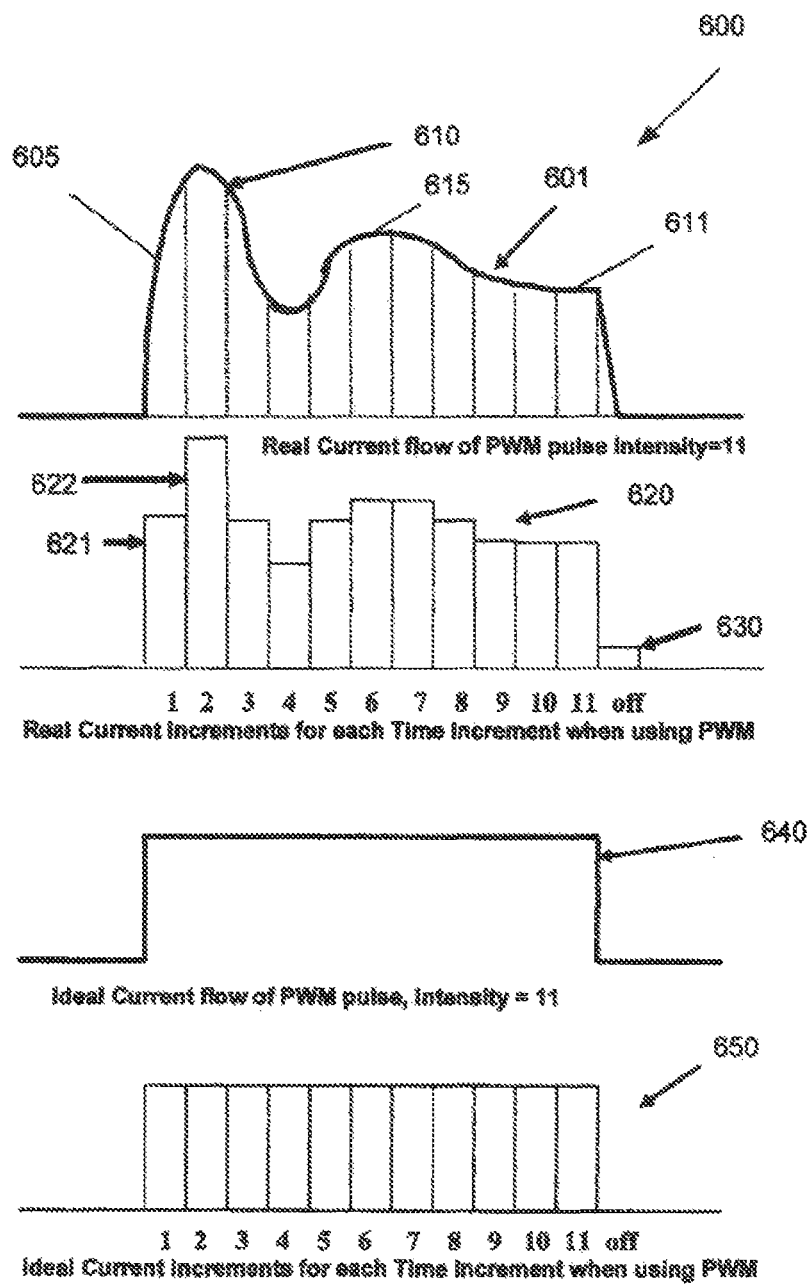
FIG. 6 includes a collection of waveforms contrasting real life current flow verses idealized current flow for the same pulse.

FIG. 6 includes a collection 600 of timing diagrams illustrating shortcomings of PWM techniques. In FIG. 6, curve 640 represents a PWM pulse time which is desired to be 11 times the power of a single time period. In an ideal world, the resulting current packets 1 through 11 shown on curve 650, would all be identical in time, size, and shape, specifically, perfectly rectangular. In real electronic circuits, however, inductance and capacitance and the laws of physics governing the speed of electron flow, result in the actual waveform of the resulting current represented by curve 601. On this waveform, it can be seen that the first part of the wave exhibits a risetime at 605, due to the inductive effects of the electronics. The same inductance will cause the current to overshoot, as shown at 610, to a level higher than would be encountered in an ideal, purely resistive situation. The current then goes through a period or ringing, at 615 to 611 of the curve, until finally settling down to a steady value, which would never occur if the PWM pulse is relatively short compared to the maximum total ringing time. The resulting packets of current for each of the time periods of the PWM pulse are represented by curve 620. As shown, the first packet of time 621, is less than the second packet 622, and each is different to all others, until the ringing eventually stops, but likely not at the same value as the first pulse. Even when the PWM pulse comes to a stop, the real life cut off of current results in the current flow represented by 630. Thus the PWM method cannot provide multiples of a single pulse, simply by extending the time period by a multiple amount. This example shows only the current flow side of the PWM method. When reactive components of power and the power factor (i.e. instantaneous Voltage X instantaneous Current) are taken into account, the discrepancy from ideal is even more distorted. Thus control by PWM in exact values is not achievable.

FIG. 7 includes a collection 700 of timing waveforms corresponding to FFFD embodiments of the present disclosure. FIG. 7 shows how FFFD pulses are not affected by the ringing of real life circuits. Curve 705 is the potential waveform (equivalent to the risetime and ringing of 601) when the circuit is switched from an OFF to an ON state, and curve 701 shows the real life current flow through the circuit, complete with rise time distortion and shut off leakage at the trailing edge, for a short FFFD pulse. The total current packet is represented by 710, which includes all of the risetime, ringing, and shut off distortions, but cut off at the end of the basic period of the first pulse. When multiple FFFD pulses are provided to the power switch, the results are multiple packets of current flow, shown as 715. Each of the 715 current packets is essentially identical to the single packet 701. The relaxation time 717 between FFFD pulses allows the real life circuits to return to the initial conditions prior to the first pulse. This means that each pulse 715 has essentially the same starting conditions as provided for pulse 705.

Accordingly, any integer increments of power can be made by FFFD techniques according to the present disclosure, by simply increasing the number of pulses. A limiting factor can be that the maximum resolution of power increments should fit into the Tcycle time period, e.g., period 211 of FIG. 2, and these numbers are chosen as part of the design cycle when using the FFFD method.

The advantages of fixed duration pulses in the FFFD may seem to be available to the Variable Frequency (VF) method as well, figure 310, 315, but this is not actually the case, as will be explained. Although the ON period is the same for all of the pulses in the VF method, there are several disadvantages of this approach. The perfect generation of all frequencies by a digital computer is impossible, because of its digital nature. For example, if 1000 hertz is used as a reference frequency for the lowest value of required power, and this is generated in one pulse every 1.0 milliseconds, then the value for 3 would be 3 kilohertz, or 333.333333 hertz, which cannot be exactly achieved digitally. Consider that this problem would occur for at least every prime number, and that the digital "granularity" would be more of a problem with shorter time periods, as the pulses got closer together i.e. higher performance systems. Consider also that in figure 315, the time between pulses varies with every change in frequency. That means that the relaxation time (i.e., OFF time) varies with every different value of frequency. Consequently, for each frequency, the initial conditions are different, as there has been a different amount of settling time between the pulses. Again, this problem would be most prevalent when the time between pulses becomes shorter, e.g., for high performance systems. FFFD techniques, by holding both the frequency and pulse ON periods constant, can assure that the power increments are as close as possible to the theoretical numeric values.

Additionally, FFFD techniques can offer another advantage over VF techniques. For example, with FFFD techniques, the pulse timings are constant, and can be chosen so that there is no Radio Frequency Interference (RFI) at sensitive frequencies. In contrast, with VF, the frequencies are varying and radiate at many frequencies and their harmonics, which can cause unwanted RFI. This is especially true for such applications as on aircraft and hospitals, where RFI can cause drastic problems. VF under these conditions may require RFI shielding, whereas once the FFFD timings are set, any RFI is at fixed and therefore predictable frequencies. The RFI problem is especially present when the pulses are used to drive a motor, since the inherent use of power by the motor windings is to form and collapse magnetic fields.

FFFD techniques according to the present disclosure can have distinct advantages in other ways. Take for example, its use to drive electric motors. U.S. Pat. No. 5,442,272, entitled "Current Limiting For Electric Motor Start-up," teaches that it is necessary to have additional external components to prevent excessive current from flowing when a DC motor is started from a stopped condition. By using an FFFD approach, however, the pulse durations can be chosen to give pulsed power periods that do not overdrive the motor windings when the motor is stopped and there is no back EMF. This can also prevent the excessive current condition should the mechanical load on the motor be so large as to stall the motor movement—the pulse durations and spacing can be chosen so as to not allow the windings to overheat. With PWM, a controller trying to compensate for an overloaded motor may increase the length of the duty cycle to one that is damaging to the related motor; FFFD techniques can prevent such an occurrence.

The majority of electronics are controlled by computers utilizing digital circuitry. The FFFD method is more suited to computer applications than either PWM or VF, due to the digital nature of computers. Computers typically run with a set clock, which means that the execution of computer instructions (i.e., running the software) occurs only at particular parts of the computer clock cycle. Typically, a computer clock runs at some multiple of the machine language instruction set.

Figure 8:
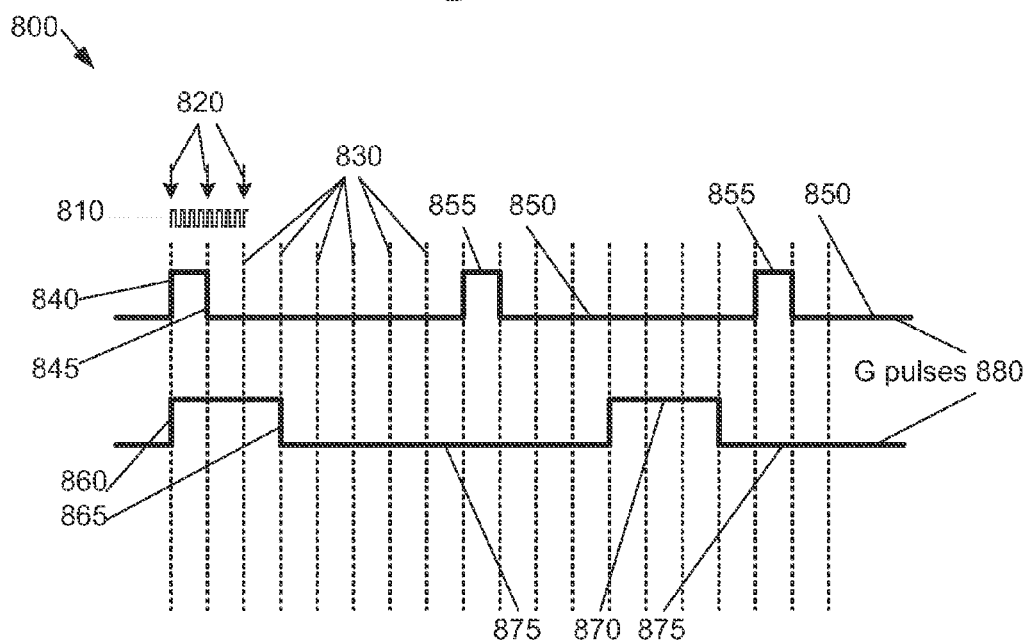
FIG. 8 includes a collection of waveforms showing the timing signals for G FFFD pulses generated by a computer or processor, in accordance with exemplary embodiments of the present disclosure.

Drawing attention to FIG. 8, a collection 800 of waveforms is shown, depicting the timing signals for G FFFD pulses generated by a computer or processor, in accordance with exemplary embodiments of the present disclosure.

In FIG. 8, the computer clock signal is shown as signal 810. In a typical computer chip, the "execute" part (of typically four parts in a whole computer cycle) of the computer's machine instruction happens typically each 4th clock cycle, (although some special types of computer machine instructions may vary, they are still an even integer number of clock cycles). This means that if the computer attempted to generate a pulse cycle of high, then low, then high states on an output port, these changes of state could only happen at discrete times, indicated by each 4th cycle, as indicated by 820 in FIG. 8, and recurring as the discrete time marks indicated by the lines 830. Thus, the fastest pulse would be one consisting of four (4) clock periods, as shown at 840.

With continued reference to FIG. 8, for the case where one computer instruction sets the line high at 840, the resetting of the output port to a low could happen only at 845 at the earliest, or any other time marker 830, but not any time in between. For example, the high period 860 on FIG. 8 represents a pulse of three (3) full computer timing cycles. A pulse in between full computer cycles, such as 2.7, is impossible due to the inherent operation of the computer. Similarly, the low, or recovery portion of the pulses 850, 875, are also integer values of the computer cycle times. In the examples shown, the off or low periods of 850 is seven (7) computer cycles long, and for 875 it is nine (9) computer cycles long. Once these two periods, i.e., the high state period 840 or 860, and the low state period 850, 875, are selected by the user of the FFFD electronic circuit, the two periods are concisely reproduced due to the nature of the computer's operation. For this reason, the output port of a computer can only be toggled from one state to another at discrete times 830 and it becomes clear why the VF approach to controlling the power to a motor or other electrical load, is imprecise, as fractions of a pulse are not possible.

Figure 9:
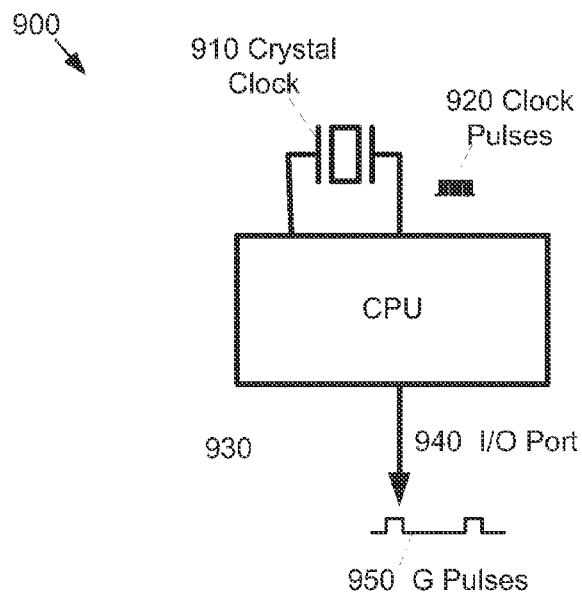
FIG. 9 depicts a circuit diagram of a processor system configured to produce G pulses for FFFD power control techniques, in accordance with exemplary embodiments of the present disclosure.

The hardware to generate the G pulse stream or train, e.g., train 880 of FIG. 8, resulting from the choice of FFFD parameters, can be achieved in one embodiment by the circuit shown in FIG. 9.

As shown, a computer chip, designated as CPU, item 930, can utilize a computer clock 910, e.g., a quartz crystal component, to derive the clock frequency 920. As can be seen, 920 provides the CPU with the clock pulses, e.g., pulse train 810 of FIG. 8, resulting in the ability of the I/O (Input/Output) port 940 to generate a G pulse signal 950, similar to 880 in FIG. 8, when the CPU 930 is running the appropriate software. Of course, the present disclosure is not limited by a particular type of oscillator or clock and any suitable type may be used for embodiments of the present disclosure.

Figure 10:
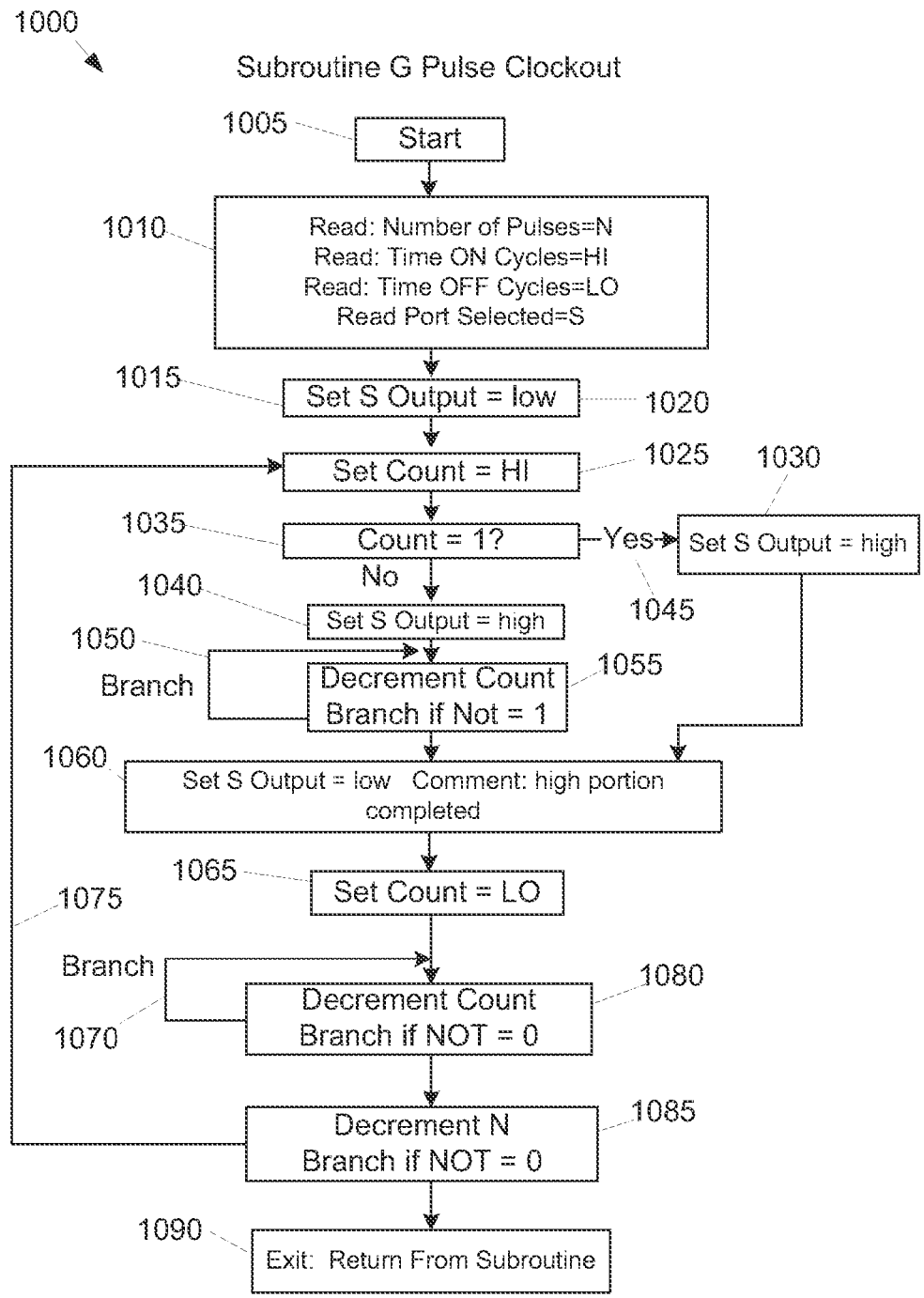
FIG. 10 depicts flow chart for the generation of G FFFD pulses by a processor system, in accordance with exemplary embodiments of the present disclosure.

The software of a CPU, e.g., CPU 930, can in exemplary embodiments include or perform the subroutine 1000 shown in FIG. 10. For subroutine 1000, the main software in the CPU calls the subroutine "G pulse Clockout" 1000, which starts at 1005, whenever the G pulse stream is to be generated, which is at the start of every Tcycle, e.g., period 211 of FIG. 2. The user can specify the following to the subroutine, e.g., at 1010: the number of pulses to be generated, N; the length in computer cycle periods of the high, or ON, period, HI; the length in computer cycle periods of the low, or OFF, period, LO; and, the I/O port number to be driven with the G pulse stream, S.

The subroutine can ensure that the G pulse stream is in the low condition, as described at 1015. It then sets the Count counter equal to the number of high cycles commanded by 1010, e.g., equal to HI. If the shortest pulse possible is required, e.g., the Count is equal to 1, then in the test for Count 1035, the program branches to 1030, which sets the I/O port S to high, then on the very next computer cycle resets it to low at 1060. Thus, when the desired ON time is a value of 1, the program/subroutine can simply toggle/switch the output of S to Hi, then Low, making the shortest pulse. If instead in instruction 1035, the Count specified is greater than 1, then the I/O port S is set to high, 1040, and the computer cycle Count is decremented one number each computer cycle by having instruction 1055 branch to itself via 1050. Each loop to itself eats up one computer cycle, and decrements the count until the last cycle, when the count equals 1, when the program continues on to instruction 1060 which terminates the high state by setting the S I/O port to low. Thus, when the value of the desired ON is 2 or more, the program inserts the extra instruction 1050, in the case of an initial value of 2, it inserts one test before dropping to the value 1, and exiting via 1060. Note that the firmware designer may preferably use the computer specification sheet to verify the time required for each type of instruction, and according to the specific computer data sheet, may adjust the instruction set accordingly. The example stated is to allow the computer to provide the shortest ON pulse for any computer. In many cases, a longer than minimum pulse length may be desired, in which case the logic of the flow chart 1000 can be used, but filler instructions such as "no ops" or even timer subroutines, can be inserted as required. After the ON pulse duration, the Count counter is then set to the number of computer cycles that the G pulse should be in the low state, e.g., LO. The loops in a branch loop 1070, back to itself 1080, decrementing the counter by one each loop, until the value reaches zero. When the counter has counted down the LO amount of cycles, the program continues to 1085. If the number of G pulses for this T cycle period was 1, then the decrement of the value of count to 0 in 1085 would cause the program to exit the subroutine, 1190, until the program calls up this subroutine again on the start of the next T cycle, e.g., Tcycle 211 of FIG. 2. If the number of pulses is greater than 1, then the decrement of N results in a non zero value, and the subroutine branches 1075 back to 1025, where the next high pulse is generated. When the number of G pulses for this Tcycle is completed, the N count will be 0, and the subroutine will exit from 1085 to 1090. Again, the use of flow chart 1000 preferably requires the proper application of the computer data sheet as to time required for each type of instruction, and it can be used for longer than minimum pulse lengths by the use of appropriate filler instructions.

The result of this subroutine is the G pulse stream, e.g., 880 of FIG. 8, where for the top pattern, HI=1, LO=7, and N=3 (shown); and for the lower pattern, HI=3, LO=9, and N=2 (shown). Note that T cycle (e.g., Tcycle 211 of FIG. 2, would be much longer than the time period shown on FIG. 8, so the number N could be much higher than those shown on FIG. 8 alone.

Figure 11:
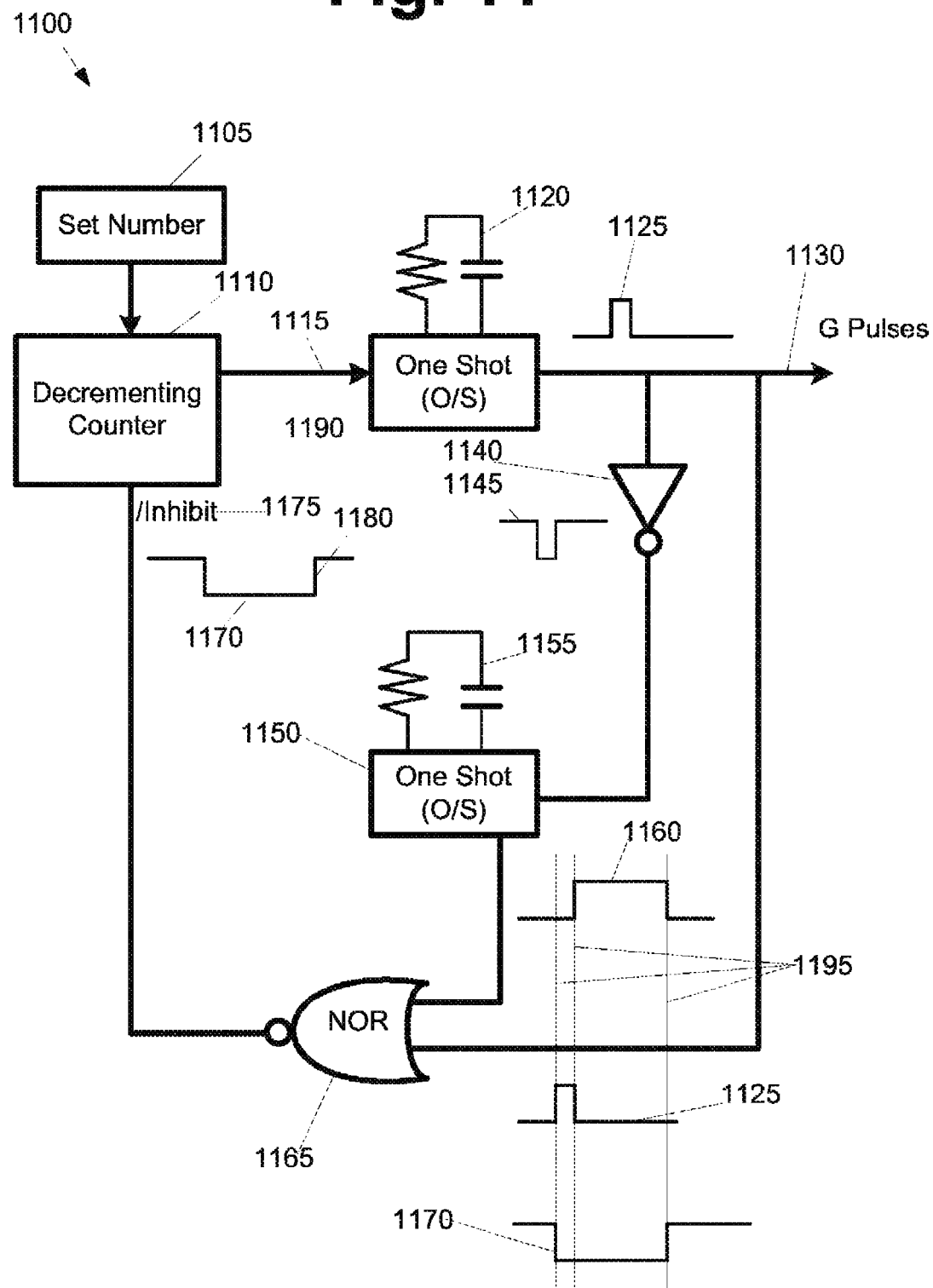
FIG. 11 depicts a circuit schematic of an analog circuit for the generation of FFFD pulses, in accordance with exemplary embodiments of the present disclosure.

FFFD techniques can in various other embodiments, have a number of FFFD pulses ("G pulses") generated by analog rather than digital components, as is illustratively explained for FIG. 11.

FIG. 11 depicts a circuit schematic of an analog circuit 1100 for the generation of FFFD pulses, in accordance with exemplary embodiments of the present disclosure. In FIG. 11, the analog circuitry 1100 includes two one-shot (or, single-shot) components 1150 and 1190, e.g., a CD 4047 CMOS device, or its equivalent in TTL or other solid state variations. As shown in FIG. 11, the number of pulses 1105 to be generated by the G pulses in this T cycle time, is loaded into a decrementing counter 1110. The non-zero state of the counter causes the zero (inversed) line to go high, 1115, triggering the one-shot 1190. The one-shot outputs a pulse 1125 of set duration time determined by RC network 1120. This configuration is most useful where the time periods for the G pulses are required to be fixed in the hardware design. Adjustment of the RC time can be achieved, e.g., by use of either a trimmer pot or a tuning capacitor within the RC configuration. Pulse 1115 is inverted by circuit 1140, providing an inverted pulse 1145 version of 1125. The rising edge of 1145 is then at the same time as the trailing edge of 1125, and triggers the one-shot 1150, which is adjusted by RC network 1155 to provide the OFF or low time of the G pulse, 1160. Again, this RC network can be trimmed by a trimmer pot or tuning capacitor, if required. Pulse 1160 and pulse 1125 are combined with NOR gate 1165 to provide pulse 1170, as shown by the timing diagram 1195. Pulse 1170 is used to inhibit the progress of counter 1110 at the pin "/inhibit" (negative inhibit line). When pulse 1170 is completed, the rising edge 1180, of pulse 1170, allows the counter 1110 to progress to the next G pulse. When counter 1110 counts down to zero, it ceases sending out pulses to the one-shot 1190 via line 1115. The 0 pulses appear in this circuit at 1130. At the end of the T cycle 211, the next batch of G pulses is output by loading the counter 1110 with the number of pulses once again.

Accordingly, embodiments of the present disclosure can provide benefits relative to previous techniques, including PWM and VF techniques. FFFD techniques according to the present disclosure utilize power train pulses with fixed-frequency fixed-duration pulses to control power applied to a given electrical load. The load can be any type of DC load. For example, embodiments of the present disclosure can provide for precise power control for fine work such as in artificial limbs, robots, remote robotic arms such as on the space vehicles, e.g., the U.S. Space Shuttle, and/or motorized medical or surgical equipment, where a fine touch (precision of movement) is critical. Other applications that require precise motor movements include control of aircraft such as pilotless drones, the movement of astronomical telescopes, and movement of long range weapons such as naval cannons, and the like.

While aspects of the present disclosure are described herein in connection with certain embodiments, it should be noted that variations can be made by one with skill in the applicable arts within the spirit of the present disclosure.

Various functions and elements described herein may be partitioned differently from those shown without departing from the spirit and scope of the present disclosure. Various modifications to these embodiments will be readily apparent to those skilled in the art, and generic principles defined herein may be applied to other embodiments. Thus, many changes and modifications may be made, by one having ordinary skill in the art, without departing from the spirit and scope of the present disclosure and claimed embodiments.

One skilled in the art will appreciate that embodiments and/or portions of embodiments of the present disclosure can be implemented in/with computer-readable storage media (e.g., hardware, software, firmware, or any combinations of such), and can be distributed or accessed over one or more networks. Steps described herein, including processing functions to derive, learn, or calculate formula and/or mathematical models utilized and/or produced by the embodiments of the present disclosure, can be processed by one or more suitable processors, e.g., central processing units ("CPUs), implementing suitable code/instructions in any suitable language (machine dependent on machine independent).

Additionally, embodiment (or portions of embodiments) of the present disclosure can be embodied in signals and/or on carriers, e.g., control signals sent over a communications channel or network. Furthermore, software embodying methods, processes, and/or algorithms (or portions thereof) of the present disclosure can be implemented in or carried by electrical/optical signals, e.g., for use with the Internet and/or wireless networks and related components.

What is claimed is:

1. A method of using pulses of fixed duration and fixed frequency for power control of electrical loads, the method comprising:
   with a processing system, providing a timing signal to a circuit, wherein the timing signal includes an ON state and an OFF state;
   determining a desired power level for an electrical load in the circuit;
   based on the timing signal, generating a control signal including a sequence of control pulses of fixed duration and fixed frequency within the timing signal and corresponding to the desired power level; and
   supplying the control signal to an input of a current switch connected to the electrical load, in the circuit, to place the switch in one of an ON state during each pulse and an OFF state after each pulse to cause current to flow from a first potential to a second potential through the electrical load during the ON state;
   wherein the circuit has an initial condition before flow of current through the current switch and the period time between each of the pulses of the timing cycle is longer than the period of time for the circuit to return to the initial condition after a pulse of the timing cycle.

2. The method of claim 1, further comprising varying the number of pulses within a repeating time cycle.

3. The method of claim 1, wherein the electrical load comprises one or more DC electric motors.

4. The method of claim 1, wherein providing a timing signal comprises using software using decrementing or incrementing counters to control the time periods of the control pulses.

5. The method of claim 3, further comprising controlling the movement of the one or more DC electrical motors.

6. The method of claim 1, wherein generating a control signal comprises using analog pulse shaping circuits.

7. The method of claim 6, further comprising controlling power applied to one or more electric motors.

8. The method of claim 1, further comprising controlling power applied to one or more electric light sources.

9. The method of claim 8, further comprising controlling the intensity of the optical output of the one or more light sources by varying the number of pulses within a repeating time cycle.

10. The method of claim 1, further comprising controlling power applied to one or more heating devices.

11. The method of claim 10, further comprising controlling a heat output by varying the number of pulses within a repeating time cycle.

12. The method of claim 1, further comprising controlling power applied to one or more switching power supplies, by varying the number of pulses within a repeating time cycle.

13. A FFFD power control circuit comprising:
   a first power potential;
   a second power potential;
   an electrical load; and
   a current switch connected to the electrical load and including an input to receive a current switch control signal to place the switch in one of an ON state and an OFF state including a timing cycle with a series of pulses of fixed duration and fixed frequency within the timing cycle to cause current to flow from the first potential to the second potential through the load during the ON state to cause the load to receive power over the timing cycle;
   wherein the circuit has an initial condition before flow of current through the current switch and the period time between each of the pulses of the timing cycle is longer than the period of time for the circuit to return to the initial condition after a pulse of the timing cycle.

14. The circuit of claim 13, wherein the load is a light emitting diode (LED).

15. The circuit of claim 13, wherein the load comprises an array of light emitting diodes.

16. The circuit of claim 13, wherein the load comprises an electric circuit of a DC motor.

17. The circuit of claim 16, wherein the DC motor is a brushless DC motor.

18. The circuit of claim 13, wherein the load comprises an electric circuit of an AC motor.

19. The circuit of claim 14, wherein the number of pulses in a timing cycle varies from zero to a maximum number corresponding to an intensity level of the LED from zero to a maximum intensity.

20. The circuit of claim 13, wherein the load comprises a heating element.

21. The circuit of claim 20, wherein the number of pulses in a timing cycle varies from zero to a maximum number corresponding to a heat output level of the heating element from zero to a maximum heat output.

22. The circuit of claim 13, further comprising a processing device to generate the current switch control signal supplied to the current switch and to time the start and end of each pulse within the timing cycle.

23. The circuit of claim 13, further comprising a second current switch connected to the load.

24. The circuit of claim 23, further comprising a shunt resistor connected to the first or second current switches and the first or second power potentials.

25. The circuit of claim 23, further comprising a shunt diode connected to the first or second current switches and the first or second power potentials.

* * * * *